United States Patent
Aminaka et al.

(10) Patent No.: US 10,405,259 B2
(45) Date of Patent: Sep. 3, 2019

(54) RADIO COMMUNICATION SYSTEM, BASE STATION, MOBILE STATION, COMMUNICATION CONTROL METHOD, AND COMPUTER READABLE MEDIUM

(71) Applicant: NEC Corporation, Tokyo (JP)

(72) Inventors: Hiroaki Aminaka, Tokyo (JP); Hisashi Futaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/655,842

(22) PCT Filed: Aug. 6, 2013

(86) PCT No.: PCT/JP2013/004746
§ 371 (c)(1),
(2) Date: Jun. 26, 2015

(87) PCT Pub. No.: WO2014/103098
PCT Pub. Date: Jul. 3, 2014

(65) Prior Publication Data
US 2016/0198390 A1    Jul. 7, 2016

(30) Foreign Application Priority Data
Dec. 28, 2012    (JP) .................................. 2012-288209

(51) Int. Cl.
*H04W 40/24*    (2009.01)
*H04W 16/32*    (2009.01)
(Continued)

(52) U.S. Cl.
CPC ......... *H04W 40/248* (2013.01); *H04W 16/32* (2013.01); *H04W 36/04* (2013.01);
(Continued)

(58) Field of Classification Search
CPC ............. H04W 84/045; H04W 40/248; H04W 72/0406; H04W 72/10; H04W 88/10
(Continued)

(56) References Cited

U.S. PATENT DOCUMENTS

2010/0039987 A1* 2/2010 Hegde ................... H04W 40/02
370/328
2011/0294508 A1  12/2011 Min et al.
(Continued)

FOREIGN PATENT DOCUMENTS

CN         102833802 A      12/2012
EP         2 866 494 A1      4/2015
(Continued)

OTHER PUBLICATIONS

NTT Docomo, Inc., "Requirements, Candidate Solutions & Technology Roadmap for LTE Rel-12 Onward", RWS-120010, 3GPP Workshop on Release 12 and onwards, pp. 1-27, Jun. 2012.
(Continued)

*Primary Examiner* — Faruk Hamza
*Assistant Examiner* — Jean F Voltaire
(74) *Attorney, Agent, or Firm* — Finnegan, Henderson, Farabow, Garrett & Dunner, L.L.P.

(57) ABSTRACT

A first base station (1) is configured to send, to a second base station (2), first configuration information that is necessary to establish a data bearer and a data radio bearer in the second base station (2) for a C/U-plane split scenario (S105). Further, the first base station (1) is configured to keep the first configuration information in the first base station (1) even after the data bearer and the data radio bearer are established in the second base station (2) (S109). It is thus, for example, possible to contribute to a reduction in a path switch delay when a UE moves between cells in the C/U-plane split scenario.

50 Claims, 22 Drawing Sheets

(51) Int. Cl.
*H04W 36/04* (2009.01)
*H04W 72/04* (2009.01)
*H04W 28/18* (2009.01)
*H04W 92/20* (2009.01)
*H04W 84/04* (2009.01)
*H04W 76/15* (2018.01)

(52) U.S. Cl.
CPC ............ *H04W 72/04* (2013.01); *H04W 28/18* (2013.01); *H04W 76/15* (2018.02); *H04W 84/045* (2013.01); *H04W 92/20* (2013.01)

(58) Field of Classification Search
USPC ....................................................... 370/328
See application file for complete search history.

(56) References Cited

U.S. PATENT DOCUMENTS

| | | | | |
|---|---|---|---|---|
| 2012/0320817 | A1* | 12/2012 | Xu .......................... | H04W 8/08 370/315 |
| 2014/0004863 | A1* | 1/2014 | Zhang ............... | H04W 36/0033 455/444 |
| 2015/0131618 | A1* | 5/2015 | Chen ..................... | H04W 16/02 370/332 |

FOREIGN PATENT DOCUMENTS

| | | | | |
|---|---|---|---|---|
| EP | 2 887 735 | A1 | 6/2015 | |
| EP | 2 906 009 | A1 | 8/2015 | |
| WO | WO 2011/137784 | A1 * | 5/2011 | ............ H04W 36/30 |
| WO | WO 2011/13784 | A1 | 11/2011 | |
| WO | WO 2011/149316 | A2 | 12/2011 | |
| WO | WO 2012/147656 | A1 | 11/2012 | |

OTHER PUBLICATIONS

Samsung, "Add Rel-11, scenarios for HeNB mobility enhancement", 3GPP TSG-RAN3 Meeting #78, R3-122638, Nov. 2012.
Ericsson, "Response document to R3-100907 (Rapporteur's update for S1AP protocol)", 3GPP TSG-RAN WG3 #67, R3-101013, pp. 1-8, Feb. 2010.
Ericsson, "Termination of the S1/X2 interfaces in relay node", 3GPP TSG-RAN WG2 #66, Tdoc R2-092953, pp. 1-4, May 2009.
International Search Report dated Oct. 8, 2013 in corresponding PCT International Application.
H. Ishii et al., "A Novel Architecture for LTE-B: C-plane/U-plane Split and Phantom Cell Concept", GC'12 Workshop: International Workshop on Emerging Technologies for LTE-Advanced and Beyond-4G, pp. 624-630, Dec. 2012.
Extended European Search Report dated Jul. 5, 2016, by the European Patent Office in counterpart European Patent Application No. 13869592.9.
NEC, "Consideration of the possible structures on the dual connectivity", 3GPP TSG-RAN WG3 Meeting #79, R3-130138, 3 rd Generation Partnership Project (3GPP), St. Julian's, Malta pages, pp. 1-5, Jan. 18, 2013.
Decision to Grant A Patent from the Japanese Patent Office in Japanese, Patent Application No. 2014-554068, dated May 16, 2017.
Panasonic, "SCell Configuration at SCell Addition and HO", 3GPP TSG RAN WG2#71bis, R2-105763, Oct. 11-15, 2010, Xi'an, China.
Notification of First Office Action dated Nov. 18, 2017, issued by the State Intellectual Property Office of the People's Republic of China (SIPO) in counterpart Chinese Application No. 201380068880. X.

* cited by examiner

RADIO COMMUNICATION SYSTEM, BASE STATION, MOBILE STATION, COMMUNICATION CONTROL METHOD, AND COMPUTER READABLE MEDIUM

CROSS-REFERENCE TO RELATED PATENT APPLICATIONS

This application is a National Stage Entry of International Application No. PCT/JP2013/004746, filed Aug.6, 2013, which claims priority from Japanese Patent Application No.2012-288209, filed Dec.28, 2012. The entire contents of the above-referenced applications are expressly incorporated herein by reference.

TECHNICAL FIELD

The present invention relates to a radio communication system, and more particularly, to network architecture in a small cell enhancement scenario.

BACKGROUND ART

In the Long Term Evolution (LTE) Release 12 according to the 3rd Generation Partnership Project (3GPP), "local area enhancement" or "small cell enhancement" for accommodation of a large amount of local traffic, improvement in throughput, and efficient use of a high-frequency band has become one of the subjects for discussion (see Non-patent literature 1). In the local area enhancement or the small cell enhancement, a low-power node (LPN) that forms a small cell is used.

Further, a C/U-plane split scenario has been proposed regarding the small cell enhancement. In the C/U-plane split, a macro cell provides a control plane (e.g., Radio Resource Control (RRC) connection, and Non-Access Stratum (NAS) message transfer) for a mobile station (User Equipment (UE)) and a small cell provides a user plane for the UE. In one specific example of the C/U-plane split scenario, for the Control plane (C-plane), the macro cell can keep a good connection with the UE by a wide coverage using a low frequency band and support mobility of the UE. Meanwhile, for the user plane (U-plane), the small cell can provide a local high throughput for the UE by using a wide bandwidth in a high frequency band.

In the C/U-plane split scenario, a case in which a small cell does not require transmission of existing cell specific signals/channels (e.g., Primary Synchronization Signal (PSS), Secondary Synchronization Signal (SSS), Cell-specific Reference Signal (CRS), Master Information Block (MIB), and System Information Block (SIB)) is also assumed. Such a new small cell may be referred to as a phantom cell. Further, a base station (eNB) or an LPN that provides a small cell may be referred to as a Phantom eNodeB (PhNB).

CITATION LIST

Non Patent Literature

[Non-Patent Literature 1] 3GPP RWS-120010, NTT DOCOMO, "Requirements, Candidate Solutions & Technology Roadmap for LTE Rel-12 Onward", 3GPP TSG RAN Workshop on Rel-12 and Onwards Ljubljana, Slovenia, 11-12 Jun. 2012

SUMMARY OF INVENTION

Technical Problem

As described above, the C/U-plane split scenario in which the C-plane is provided for UEs in a cell controlled by the MeNB and the U-plane is provided for the UEs in a cell controlled by the LPN has been proposed. In the following description, a cell that provides the C-Plane in the C/U-plane split scenario is referred to as a primary cell (PCell) and a cell that provides the U-Plane in the C/U-plane split scenario is referred to as a secondary cell (SCell).

The present inventors have studied about an inter-cell movement of a UE in the C/U-plane split scenario and have found various problems therewith. Consider a case in which a UE moves within a coverage of one MeNB cell (PCell) and accordingly moves outside of a first LPN cell (SCell) with which the UE establishes a data radio bearer (DRB) in the C/U-plane split scenario. In this case, first and second mobility scenarios that will be described below may be considered.

In the first mobility scenario, the first LPN cell is sparsely deployed so that the first LPN cell does not overlap other LPN cells, and thus the UE changes the SCell (i.e., DRB that is established in the SCell) from the first LPN cell to the MeNB cell. If a normal S1 handover procedure is applied to the UE movement in the first mobility scenario, wasted signaling occurs, which increases a path switch delay (i.e., data bearer switching delay time). This is because, since the C-Plane is established in the MeNB cell, there is no need to change the C-Plane in the first handover scenario. Accordingly, when the normal handover procedure is used, signaling to change the C-Plane from a source cell to a target cell is wasted. Therefore, special considerations must be taken in the C/U-plane split scenario.

In the second mobility scenario, the first LPN cell and a second LPN cell are closely deployed so that the first LPN cell partially overlaps the second LPN cell. Therefore, the UE changes the S Cell (i.e., DRB established in the SCell) from the first LPN cell to the second LPN cell. Similar to the first mobility scenario, in the second mobility scenario, the problem regarding the path switch delay occurs.

Accordingly, one object of the present invention is to provide a radio communication system, a base station, a mobile station, a communication control method, and a program that contribute to a reduction in a path switch delay when a UE moves between cells in the C/U-plane split scenario.

Solution to Problem

In a first aspect, a radio communication system includes first and second base stations, a core network, and a mobile station. The core network includes a mobility management apparatus and a data transfer apparatus. The first base station operates a first cell and the second base station operates a second cell. The first base station is configured to establish a first signaling bearer with the mobility management apparatus, establish a second signaling bearer with the second base station, and establish a signaling radio bearer with the mobile station in the first cell. The second base station is configured to establish the second signaling bearer with the first base station, establish a data bearer with the data transfer apparatus, and establish a data radio bearer with the mobile station in the second cell. The first base station is further configured to send, to the second base station via the second signaling bearer, first configuration information that is necessary to establish the data bearer and the data radio bearer in the second base station. The first base station is further configured to keep the first configuration information in the first base station even after the data bearer and the data radio bearer are established in the second base station.

In a second aspect, a first base station includes a radio communication unit that operates a first cell, and a controller. The controller is configured to perform control to establish a first signaling bearer with a mobility management apparatus in a core network, establish a second signaling bearer with a second base station that operates a second cell, and establish a signaling radio bearer with a mobile station in the first cell. The controller is further configured to send, to the second base station via the second signaling bearer, first configuration information that is necessary to establish a data bearer and a data radio bearer in the second base station. The controller is further configured to keep the first configuration information even after the data bearer and the data radio bearer are established in the second base station. The data bearer is established between the second base station and a data transfer apparatus in the core network. The data radio bearer is established between the second base station and the mobile station in the second cell.

In a third aspect, a mobile station is used in combination with the radio communication system according to the above first aspect, and includes a radio communication unit and a controller. The controller is configured to control the radio communication unit to receive configuration information regarding the data radio bearer from the first base station and receive or transmit user data using the second cell.

In a fourth aspect, a communication control method, in a first base station that operates a first cell, includes:

(a) performing control to establish a first signaling bearer with a mobility management apparatus in a core network, establish a second signaling bearer with a second base station that operates a second cell, and establish a signaling radio bearer with a mobile station in the first cell;

(b) sending, to the second base station via the second signaling bearer, first configuration information that is necessary to establish a data bearer and a data radio bearer in the second base station, wherein the data bearer is established between the second base station and a data transfer apparatus in the core network, and the data radio bearer is established between the second base station and the mobile station in the second cell; and (c) keeping the first configuration information in the first base station even after the data radio bearer and the data bearer are established in the second base station.

In a fifth aspect, a program includes instructions for causing a computer to perform the communication control method according to the above fourth aspect.

Advantageous Effects of Invention

According to the above aspects, it is possible to provide a radio communication system, a base station, a mobile station, a communication control method, and a program which contribute to a reduction in a path switch delay when a UE moves between cells in the C/U-plane split scenario.

DESCRIPTION OF EMBODIMENTS

Hereinafter, with reference to the drawings, specific embodiments will be described in detail. Throughout the drawings, identical or corresponding components are denoted by the same reference symbols, and overlapping descriptions will be omitted as appropriate for the sake of clarification of description.

First Embodiment

Figure 1:
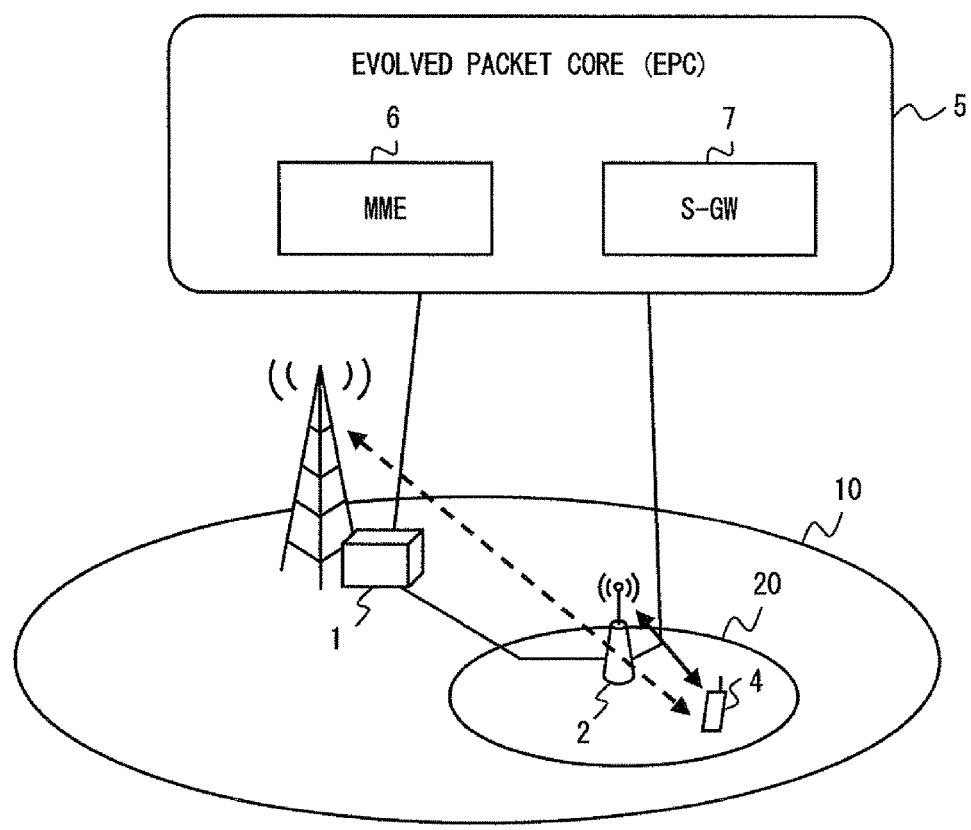
FIG. 1 is a diagram showing a configuration example of a radio communication system (e.g., LTE system) according to a first embodiment.

FIG. 1 shows a configuration example of a radio communication system according to the embodiment. The radio communication system according to the embodiment includes a first base station 1, a second base station 2, a mobile station 4, and a core network 5. The base stations 1 and 2 operate a first cell 10 and a second cell 20, respectively. The core network 5 includes a mobility management apparatus 6 and a data transfer apparatus 7. In the following description, for the sake of simplification of the description, a case in which the radio communication system according to the embodiment is an LTE system will be described as an example. Accordingly, the first base station 1 corresponds to an MeNB, the second base station 2 corresponds to an LPN, the mobile station 4 corresponds to a UE, the core network 5 corresponds to an Evolved Packet Core (EPC), the mobility management apparatus 6 corresponds to a Mobility Management Entity (MME), and the data transfer apparatus 7 corresponds to a Serving Gateway (S-GW).

The radio communication system according to the embodiment applies the C/U-plane split to the cells 10 and 20. That is, the LPN 2 provides U-plane services for the UE 4 in the cell 20. In other words, the LPN 2 establishes a data radio bearer (DRB) with the UE 4 and transfers user data of the UE 4. The MeNB 1 provides C-Plane services in the cell 10 for the UE 4 which establishes the DRB with the LPN 2. In other words, the MeNB 1 establishes a signaling radio bearer (SRB) with the UE 4 and provides RRC signaling, for example, to establish and modify the DRB in the cell 20 of the LPN 2, and NAS message transfer between the EPC 5 and the UE 4. The MeNB 1 may transmit, on a downlink channel (e.g., Physical Broadcast Channel (PBCH) or Physical Downlink Shared Channel (PDSCH)) of the cell 10, master information (e.g., system bandwidth, and the number of transmission antennas) and system information (e.g., parameters regarding the DRB in the cell 20) regarding the cell 20 of the LPN 2.

The MeNB 1 may not provide all the C-plane services regarding the UE 4. For example, the LPN 2 may control a layer 1 (physical layer) and a layer 2 (Media Access Control (MAC) sublayer and Radio Link Control (RLC) sublayer) regarding the data radio bearer that is established for the LPN 2. Specifically, the LPN 2 may receive layer 1/layer 2 control signals (e.g., Hybrid Automatic Repeat Request (H-ARQ) ACK, Channel Quality Indicator (CQI), Precoding Matrix Indicator (PMI), and Rank Indicator (RI)) using an uplink control channel (e.g., Physical Uplink Control Channel (PUCCH)) or an uplink data channel (e.g., Physical Uplink Shared Channel (PUSCH)). The LPN 2 may transmit downlink scheduling information, ACK/NACK for uplink transmission and the like to the UE 4 using a downlink control channel (e.g., Physical Downlink Control Channel (PDCCH)).

The EPC 5 is a network that is generally managed by an operator that provides mobile communication services. The EPC 5 has control plane (C-plane) functions including mobility management (e.g., location registration and location update) and bearer management (e.g., bearer establishment, bearer modification, and bearer release) of the UE 4, and user plane (U-plane) functions including transferring user data of the UE 4 between the MeNB 1 and an external network (not shown) and between the LPN 2 and the external network. The MME 6 contributes to the C-plane functions in the EPC. The S-GW 7 contributes to the U-plane functions in the EPC. The S-GW 7 is arranged at a boundary between the EPC 5 and a radio access network (RAN) including the MeNB 1 and the LPN 2.

Figure 2:
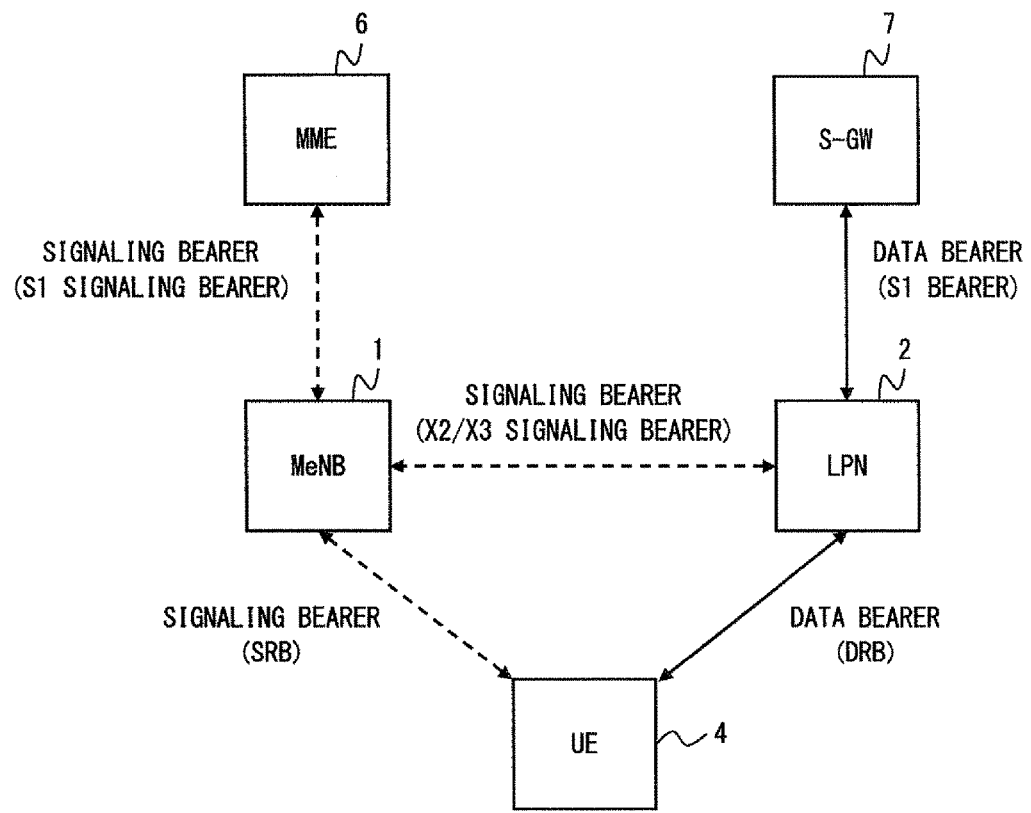
FIG. 2 is a diagram showing one example of bearer architecture in the radio communication system according to the first embodiment.

In the following description, with reference to FIGS. 2 and 3, the bearer architecture according to this embodiment will be described. FIG. 2 shows a first example of the bearer architecture related to the user data transfer in the cell 20. The radio bearer has already been described above. That is, the MeNB 1 establishes the SRB with the UE 4, and provides, in the cell 10, C-plane services including RRC signaling, for example, to establish and modify the DRB on the cell 20 and NAS message transfer between the EPC 5 and the UE 4. Meanwhile, the LPN 2 establishes the DRB with the UE 4 and transmits and receives the user data of the UE 4 in the cell 20.

Next, bearers between the EPC 5 and the MeNB 1 and between the EPC 5 and the LPN 2 will be described. A signaling bearer (i.e., S1 signaling bearer using an S1-MME interface) with the EPC 5 is established between the MME 6 and the MeNB 1. The MeNB 1 establishes the S1 signaling bearer with the MME 6 and sends and receives S1 Application Protocol (S1-AP) messages to and from the MME 6. Meanwhile, a data bearer (i.e., S1 bearer using an S1-U interface) with the EPC 5 is established between the S-GW 7 and the LPN 2. The LPN 2 establishes the S1 bearer with the S-GW 7 and sends and receives user data of the UE 4 to and from the S-GW 7.

Further, the MeNB 1 establishes a signaling bearer with the LPN 2. The signaling bearer between the MeNB 1 and the LPN 2 is established using, for example, an X2 interface. The X2 interface is an interface between eNBs. A case in which the LPN 2 is defined as a new node and a new interface different from the X2 interface is defined between the eNB and the LPN may be considered. In this case, the signaling bearer between the MeNB 1 and the LPN 2 may be established using this new interface. In this specification, this new interface is provisionally referred to as an X3 interface. The MeNB 1 is configured to send, to the LPN 2 via an X2/X3 signaling bearer, bearer configuration information (hereinafter referred to as E-UTRAN Radio Access Bearer (E-RAB) configuration information) that is necessary to establish the S1 bearer with the S-GW 7 and the DRB with the UE 4 in the LPN 2. The E-RAB is a radio access bearer including the DRB and the S1 bearer.

According to the bearer architecture shown in FIG. 2, the LPN 2 does not require the S1 signaling bearer with the MME 6 and can set up the DRB and the S1 bearer based on E-RAB configuration information supplied from the MeNB 1. In addition, in the above-mentioned bearer architecture, a termination point of the S1 bearer (S1-U bearer) is different from a termination point of the S1 signaling bearer. That is, the LPN 2, not the MeNB 1, terminates the S1 bearer. That is, in the architecture shown in FIG. 2, the C/U planes are separated not only with regard to the signaling in the RAN but also with regard to interfaces between the EPC 5 and the RAN. As a result of this, the MeNB 1 is only required to perform signaling to establish the S1 bearer and the DRB necessary for the UE 4 to transmit and receive user data via the cell 20 and the LPN 2. In other words, in one example, the MeNB 1 needs not to terminate the S1 bearer (i.e., GPRS Tunneling Protocol (GTP) tunnel) for the communication of the UE 4 via the cell 20, and also needs not to perform forwarding of user data packets between the S1 bearer and the DRB. These processing are performed by the LPN 2. Accordingly, in one example, it is possible to reduce the processing load on the MeNB 1.

The S1 bearer is a GTP tunnel and the user data (data packet) is encapsulated in GTP tunnel packets to be transferred between the S-GW 7 and the LPN 2. For example, the GTP tunnel packets that encapsulate downlink user data arrive at the LPN 2 by being subjected to routing and forwarding by routers arranged between the S-GW 7 and the LPN 2. Accordingly, in the bearer architecture shown in FIG. 2, typically, the GTP tunnel packets are transferred without passing through the MeNB 1. In this case, the MeNB 1 need not carry out processing for terminating the S1 bearer and thus it is possible to reduce the processing load on the MeNB 1. Further, since the GTP tunnel packets do not flow through the X2/X3 interface between the MeNB 1 and the LPN 2, performance requirements on the capacity, the delay and the like of the X2/X3 interface are relaxed. It is possible, for example, to use a non-optical fiber line (e.g., wireless communication path) for the X2/X3 interface.

However, in some implementations, the GTP tunnel packets that encapsulate the user data may be transferred between the S-GW 7 and the LPN 2 via the MeNB 1. In this case, the MeNB 1 may function as a router (e.g., Internet Protocol (IP) router) and may perform routing and forwarding of the GTP tunnel packets. The routing of the GTP tunnel packets that pass through the MeNB 1 can be achieved by setting up routing tables included in the S-GW 7, the LPN 2, and the MeNB 1.

Figure 3:
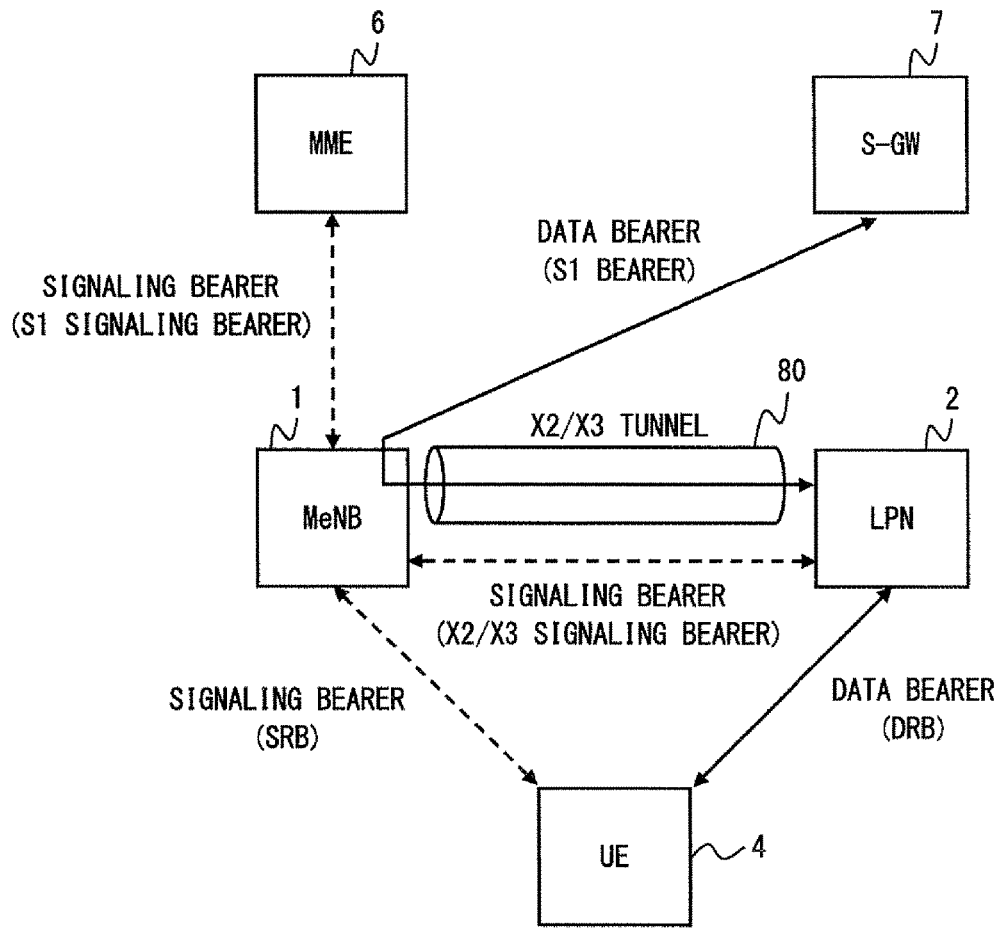
FIG. 3 is a diagram showing another example of the bearer architecture in the radio communication system according to the first embodiment.

FIG. 3 shows a second example of the bearer architecture. In the example shown in FIG. 3, the MeNB 1 performs routing and forwarding of the GTP tunnel packets. The MeNB 1 may have a proxy function to convert the IP addresses of the GTP tunnel packets. Specifically, the MeNB 1 and the LPN 2 set up a tunnel 80 (e.g., GTP Tunnel) via the X2/X3 interface. The MeNB 1 further encapsulates the GTP tunnel packets, which encapsulate the user data on the S1 bearer between the S-GW 7 and the LPN 2, and forwards the encapsulated GTP tunnel packets using the tunnel 80. The tunnel 80 may be omitted. That is, the MeNB 1 may directly forward the GTP tunnel packets without performing further encapsulation of the GTP tunnel packets.

One notable point in the example shown in FIG. 3 is that the MeNB 1 need not terminate the S1 bearer. The MeNB 1 is only required to operate as a router that forwards the GTP tunnel packets and need not perform decapsulation processing to retrieve user packets. Accordingly, an increased processing load on the MeNB 1 which is due to the GTP tunnel termination does not occur.

Another notable point in the example shown in FIG. 3 is that the MeNB 1 can monitor the GTP tunnel packets. The MeNB 1 can monitor, for example, the traffic amount of the GTP tunnel packets to be transferred. By monitoring the traffic amount of the GTP tunnel packets, the MeNB 1 can autonomously estimate the load on the cell 20 or the load on the LPN 2. Accordingly, the MeNB 1 according to the embodiment can determine deactivation of the cell 20 or the E-RAB that passes through the LPN 2, based on the traffic amount of the GTP tunnel packets monitored by the MeNB 1.

Next, the configurations and the operations of the apparatuses according to the embodiment will be described further in detail. The MeNB 1 according to the embodiment is configured to hold the E-RAB configuration information received from the MME 6 during an initial data bearer establishment procedure for establishing the DRB and the S1 bearer in the LPN 2, without discarding (releasing) the E-RAB configuration information. In other words, the MeNB 1 is configured to keep the E-RAB configuration information in the MeNB 1 even after the establishment of the DRB and the S1 bearer in the LPN 2 based on the E-RAB configuration information. In one example, when the endpoints (termination points) of the DRB and the S1 bearer for the UE 4 are changed from the LPN 2 to another base station (e.g., another eNB or another LPN), the MeNB 1 may send the E-RAB configuration information, which has been kept in the MeNB 1, to another base station without re-sending a request for establishing the S1 bearer (or S1 handover request) to the MME 6. In another example, when the endpoints (termination points) of the DRB and the S1 bearer for the UE 4 are changed from the LPN 2 to the MeNB 1, the MeNB 1 may establish the S1 bearer and the DRB in the MeNB 1 by re-using the E-RAB configuration information, which has been kept in the MeNB 1, without re-sending a request for establishing the S1 bearer (or S1 handover request) to the MME 6. When the DRB for the UE 4 is established in the MeNB 1, this DRB may be configured on the cell 10 or may be configured on a cell (secondary cell) of the MeNB 1 different from the cell 10.

As already stated above, the radio communication system according to this embodiment employs the C/U Split architecture. Therefore, the MeNB 1 is not only in charge of the C-Plane of the MeNB 1 but also in charge of the C-Plane of the cell 20 of the LPN 2 arranged in the cell 10 of the MeNB 1. Accordingly, as long as the UE 4 moves within the cell 10, the MeNB 1 is in charge of the C-Plane of the S1 bearer and the DRB for the UE 4 regardless of which one of the MeNB 1, the LPN 2, or another LPN in the cell 10 provides the S1 bearer and the DRB for the UE 4. Based on this point, the MeNB 1 according to the embodiment does not discard (release) the E-RAB configuration information received from the MME 6 during an initial data bearer establishment procedure and holds the E-RAB configuration information. When the endpoints of the S1 bearer and the DRB are changed to the MeNB 1 or another base station due to a movement of the UE 4 in the cell 10, the MeNB 1 re-uses the E-RAB configuration information, which has been kept in the MeNB 1. It is therefore possible to omit at least a part of the handover processing performed between the MeNB 1 and the MME 6 in this embodiment. Accordingly, this embodiment contributes to a reduction in the path switch delay (i.e., data bearer switching delay time) when the UE 4 moves between cells in the C/U-plane split scenario.

Figure 4:
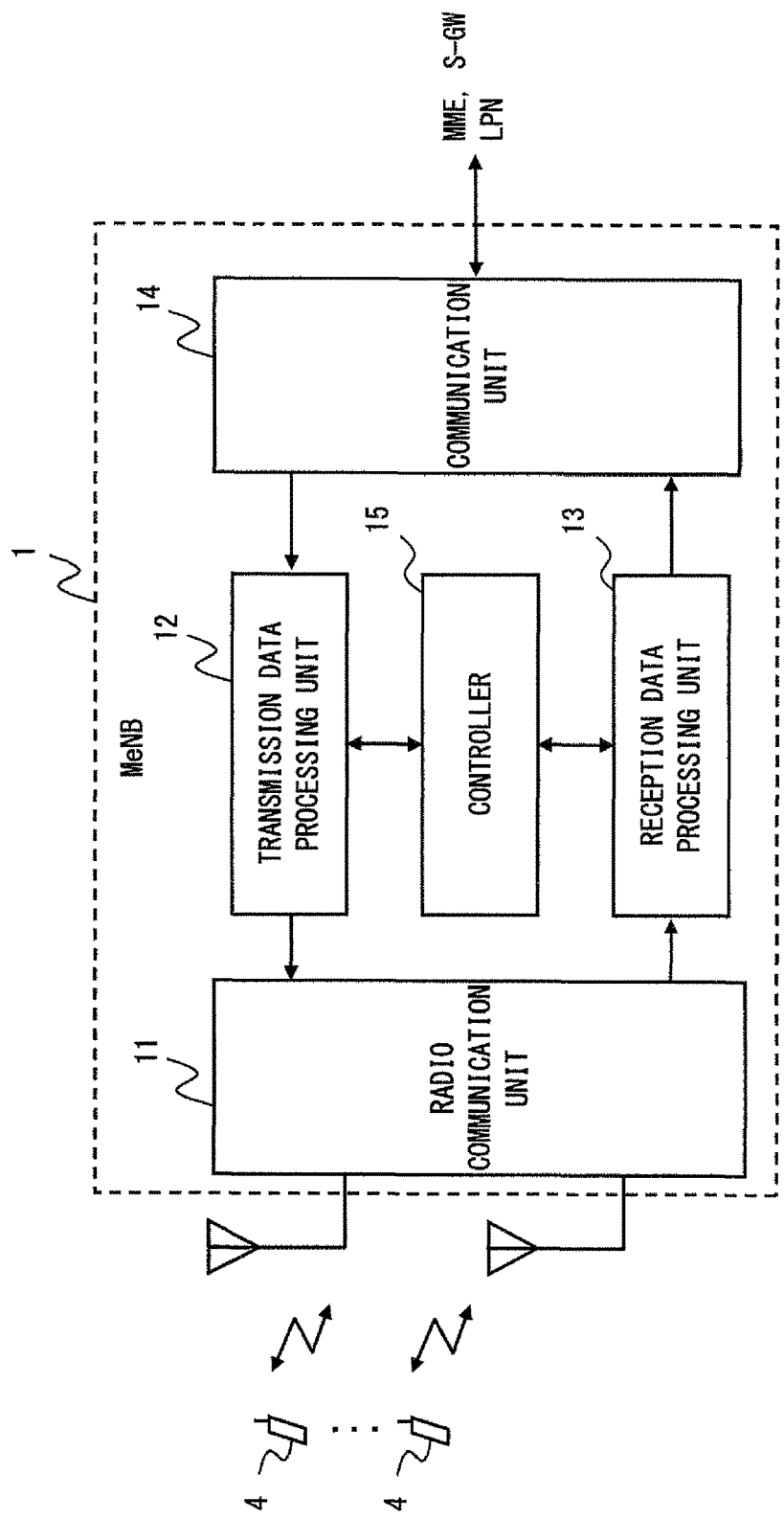
FIG. 4 is a diagram showing a configuration example of a first base station (e.g., MeNB) according to the first embodiment.

In the following description, configuration examples of the MeNB 1, the LPN 2, the UE 4, the MME 6, and the S-GW 7 according to the embodiment will be described. FIG. 4 is a block diagram showing a configuration example of the MeNB 1. A radio communication unit 11 receives an uplink signal transmitted from the UE 4 via an antenna. A reception data processing unit 13 restores the received uplink signal. The resultant received data is transferred to another network node (e.g., the MME 6 or the S-GW 7) via a communication unit 14. For example, uplink user data received from the UE 4 in the cell 10 is transferred to the S-GW 7. Further, NAS data among control data received from the UE 4 is transferred to the MME 6. Further, the reception data processing unit 13 receives from a controller 15 the control data to be transmitted to the LPN 2 or the MME 6 and sends the control data to the LPN 2 or the MME 6 via the communication unit 14.

A transmission data processing unit 12 acquires user data destined for the UE 4 from the communication unit 14, and generates a transport channel by performing error correction coding, rate matching, interleaving and the like on the user data. The transmission data processing unit 12 then generates a transmission symbol sequence by adding control information to the data sequence of the transport channel. The radio communication unit 11 generates a downlink signal by performing processing such as carrier wave modulation based on the transmission symbol sequence, frequency conversion, and signal amplification, and transmits the generated downlink signal to the UE 4. Furthermore, the transmission data processing unit 12 receives the control data to be transmitted to the UE 4 from the controller 15 and transmits the control data to the UE 4 via the radio communication unit 11.

The controller 15 performs signaling with the MME 6, the LPN 2, and the UE 4 via the signaling bearers in order to enable the UE 4 to receive or transmit the user data through the cell 20 operated by the LPN 2. Specifically, the controller 15 sends an establishment request of the S1 bearer or the E-RAB to the MME 6 via the S1 signaling bearer. The controller 15 sends, to the LPN 2 via the X2/X3 signaling bearer, E-RAB configuration information that is necessary to establish the S1 bearer and the DRB in the LPN 2. The controller 15 transmits, to the UE 4 via the SRB in the cell 10, the DRB configuration information that is necessary to establish the DRB on the cell 20 in the UE 4.

Furthermore, the controller 15 is configured to keep the E-RAB configuration information in the MeNB 1 even after the establishment of the S1 bearer and the DRB in the LPN 2 based on the E-RAB configuration information. In one example, when the endpoints (termination points) of the DRB and the S1 bearer for the UE 4 are changed from the LPN 2 to another base station (e.g., another eNB or another LPN), the controller 15 may send the E-RAB configuration information, which has been kept in the MeNB 1, to another base station without re-sending the request for establishing the S1 bearer (or S1 handover request) to the MME 6. In another example, when the endpoints (termination points) of the DRB and the S1 bearer for the UE 4 are changed from the LPN 2 to the MeNB 1, the controller 15 may establish the S1 bearer and the DRB in the MeNB 1 by re-using the E-RAB configuration information, which has been kept in the MeNB 1, without re-sending the request for establishing the S1 bearer (or S1 handover request) to the MME 6.

Note that, when the endpoints of the S1 bearer and the DRB for the UE 4 are changed from the LPN 2 to the MeNB 1 or another base station, the controller 15 may generate the DRB configuration information to establish the DRB between the MeNB 1 or another base station and the UE 4 based on the E-RAB configuration information kept in the MeNB 1. The controller 15 may send the generated DRB configuration information to the UE 4 via the SRB with the UE 4 on the cell 10.

Further, the controller 15 may notify the MME 6 of the endpoint information of the S1 bearer changed from the LPN 2 to the MeNB 1 or another base station. The MME 6 sends, to the S-GW 7, the received endpoint information of the S1 bearer, and the S-GW 7 updates the radio access network (RAN) side endpoint of the S1 bearer.

Further, the controller 15 may determine to switch the S1 bearer and the DRB for the UE 4 from the LPN 2 to the MeNB 1 or another base station, in response to a trigger notification from the UE 4 or the LPN 2.

Figure 5:
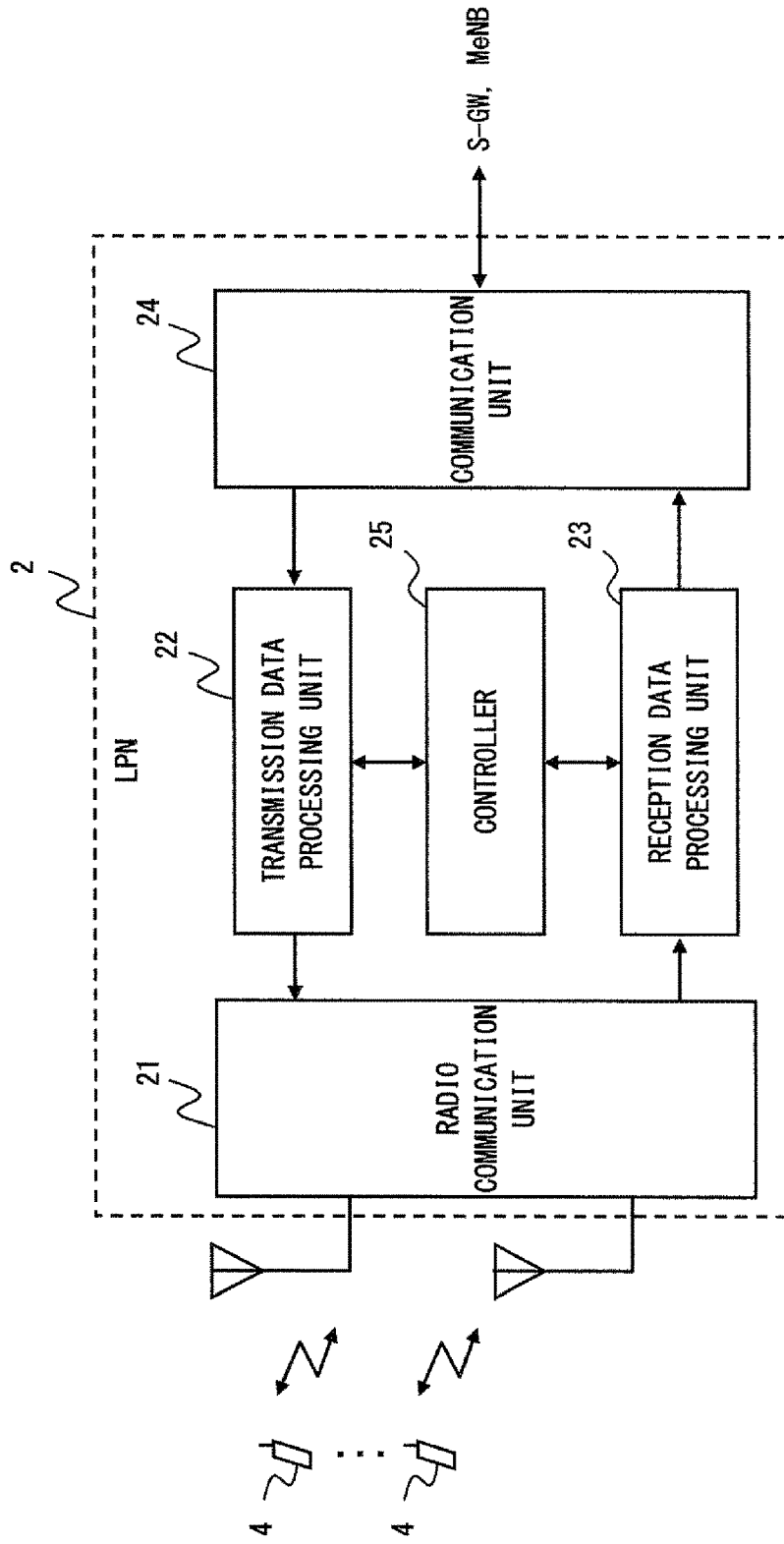
FIG. 5 is a diagram showing a configuration example of a second base station (e.g., LPN) according to the first embodiment.

FIG. 5 is a block diagram showing a configuration example of the LPN 2. The functions and the operations of a radio communication unit 21, a transmission data processing unit 22, a reception data processing unit 23, and a communication unit 24 shown in FIG. 5 are similar to those of the corresponding elements of the base station 1 shown in FIG. 4, i.e., the radio communication unit 11, the transmission data processing unit 12, the reception data processing unit 13, and the communication unit 14.

A controller 25 of the LPN 2 receives the E-RAB configuration information from the MeNB 1 (controller 15) via the X2/X3 signaling bearer, and sets up the S1 bearer with the S-GW 7 and the SRB with the UE 4 in accordance with the E-RAB configuration information.

Figure 6:
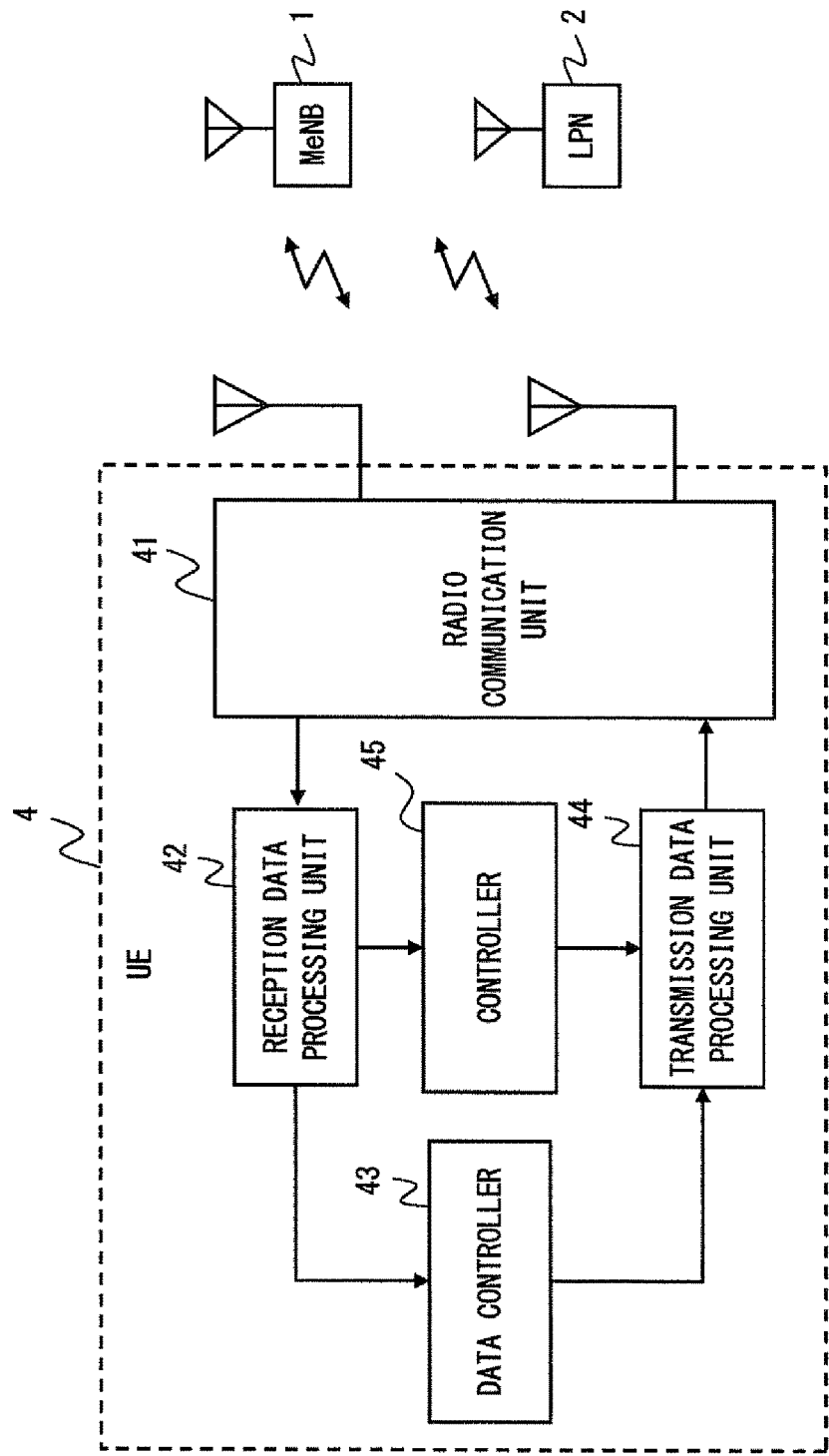
FIG. 6 is a diagram showing a configuration example of a mobile station (e.g., UE) according to the first embodiment.

FIG. 6 is a block diagram showing a configuration example of the UE 4. A radio communication unit 41 can communicate with both the cell 10 and the cell 20. In addition, the radio communication unit 41 may support carrier aggregation of a plurality of cells operated by different eNBs. In this case, the radio communication unit 41 can simultaneously use the plurality of cells 10 and 20 to transmit or receive user data. The radio communication unit 41 receives downlink signals from one or both of the eNB 1 and the LPN 2 via an antenna. A reception data processing unit 42 restores received data from the received downlink signals, and sends the received data to a data controller 43. The data controller 43 uses the received data according to the purpose thereof. A transmission data processing unit 44 and the radio communication unit 41 generate an uplink signal using transmission data supplied from the data controller 43, and transmit the uplink signal to one or both of the eNB 1 and the LPN 2.

A controller 45 of the UE 4 controls the radio communication unit 41 to establish the SRB with the MeNB 1 on the cell 10. The controller 45 then receives from the MeNB 1 the DBB configuration information to establish the DRB with the LPN 2 and controls the radio communication unit 41 to transmit or receive the user data through the cell 20. Accordingly, the UE 4 can communicate with the LPN 2 via the DRB based on the signaling with the MeNB 1.

Further, when the endpoints of the S1 bearer and the DRB for the UE 4 are changed from the LPN 2 to the MeNB 1 or another base station, the controller 45 may receive, from the MeNB 1 through the SRB on the cell 10, DRB configuration information to establish the DRB between the MeNB 1 or another base station and the UE 4. Thus the UE 4 can change the destination to which the DRB is connected from the LPN 2 to the MeNB 1 or another base station based on the signaling with the MeNB 1.

Figure 7:
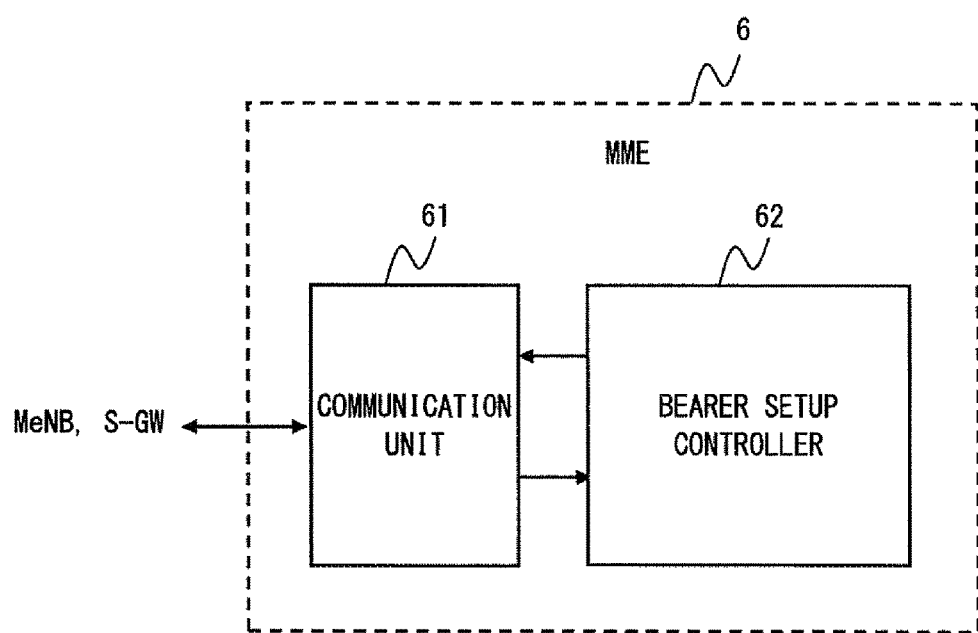
FIG. 7 is a diagram showing a configuration example of a mobility management apparatus (e.g., MME) according to the first embodiment.

FIG. 7 is a block diagram showing a configuration example of the MME 6. A communication unit 61 communicates with the MeNB 1 and the S-GW 7. A bearer setup controller 62 communicates with the MeNB 1 and the S-GW 7 via the communication unit 51, and controls the setup of the data bearer or the signaling bearer in these apparatuses. Specifically, in response to receiving a setup request of the data bearer (E-RAB or S1 bearer) from the MeNB 1, the bearer setup controller 62 requests the S-GW 7 to set up the S1 bearer, and sends to the MeNB 1 the bearer configuration information (i.e., E-RAB configuration information) regarding the E-RAB or the S1 bearer.

Further, the bearer setup controller 62 may receive, from the MeNB 1, a message (e.g., path switch request) indicating that the endpoint of the S1 bearer which had been configured to the LPN 2 has been changed to the MeNB 1 or to another base station, and may instruct the S-GW 7 to change the endpoint configuration of the S1 bearer in response to the message.

Figure 8:
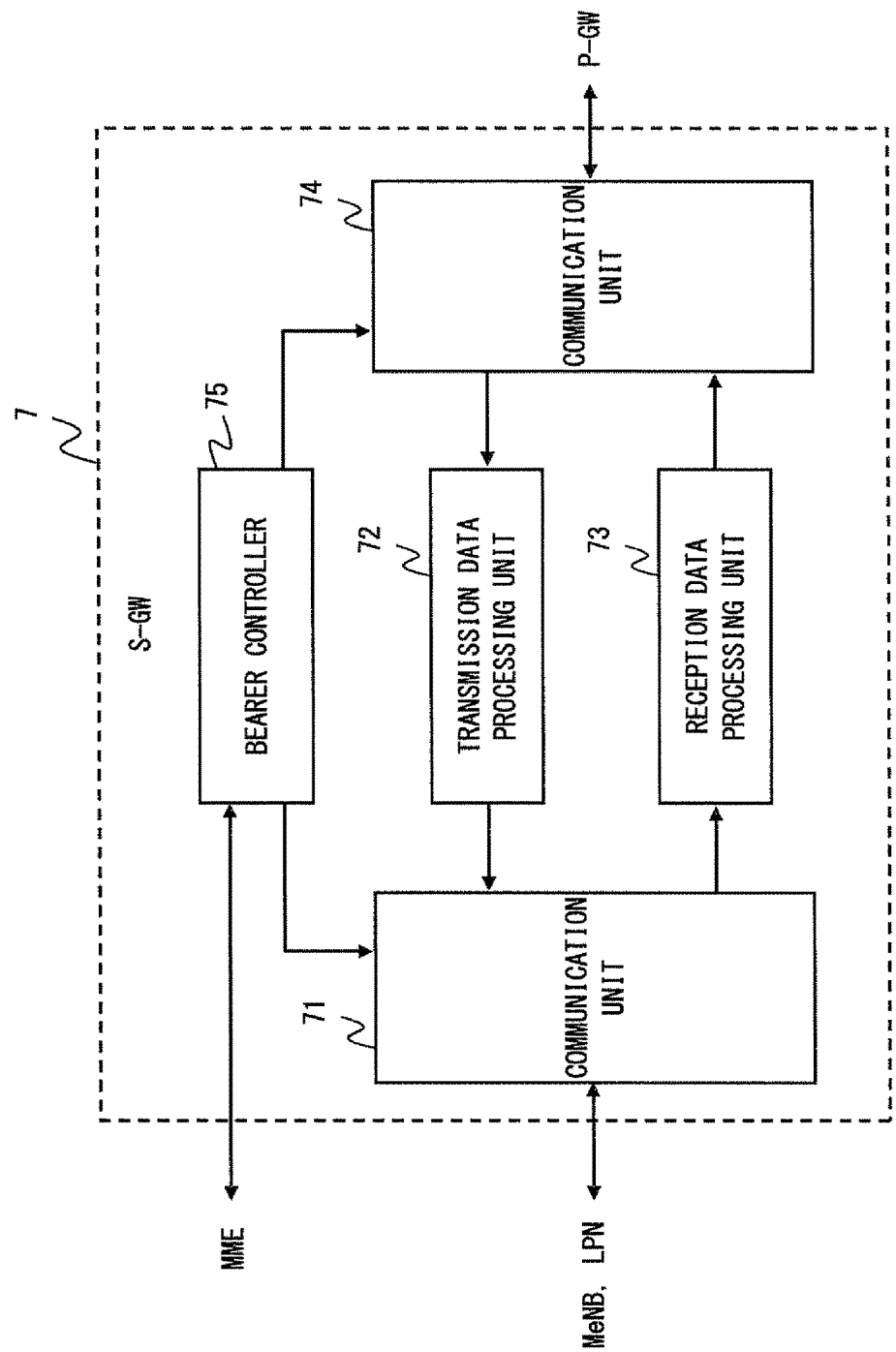
FIG. 8 is a diagram showing a configuration example of a data transfer apparatus (e.g., S-GW) according to the first embodiment.

FIG. 8 is a block diagram showing a configuration example of the S-GW 7. A communication unit 71 establishes the S1 bearer with the LPN 2 and transmits or receives user data to or from the LPN 2 through the S1 bearer. The communication unit 71 may establish the S1 bearer with the MeNB 1 to receive or transmit the user data through the cell 10 by the UE 4. A communication unit 74 sets up an S5/S8 bearer with a Packet Data Network Gateway (P-GW) in the EPC 5 and transmits and receives user data to and from another data transfer apparatus.

A transmission data processing unit 72 receives downlink user data destined for the UE 4 from the communication unit 74, and forwards the downlink user data to the S1 bearer based on mapping between the upstream side S5/S8 bearer and the downstream side S1 bearer. A reception data processing unit 73 receives uplink user data from the communication unit 71 and forwards the uplink user data to the S5/S8 bearer based on the mapping between the S5/S8 bearer and the S1 bearer.

A bearer controller 75 communicates with the MME 6 and sets up the S1 bearer between the LPN 2 and the communication unit 71 in accordance with the control of the MME 6. When the endpoint of the S1 bearer has been changed from the LPN 2 to the MeNB 1 or another base station, the bearer controller 75 may change the RAN side endpoint configuration of the S1 bearer in accordance with the instruction from the MME 6.

Figure 9:
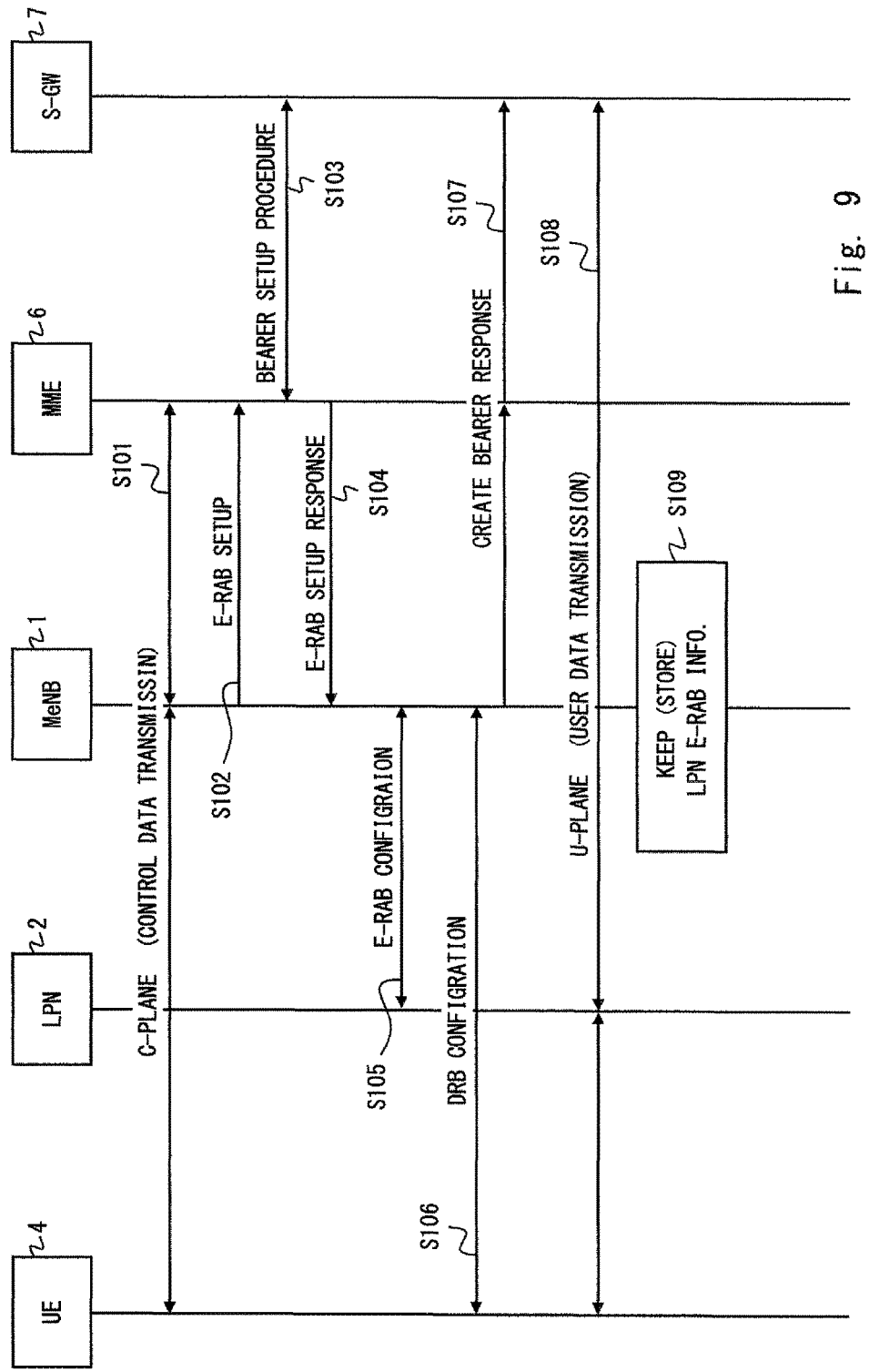
FIG. 9 is a sequence diagram showing one example of a communication control method according to the first embodiment.

In the following description, with reference to a sequence diagram in FIG. 9, specific examples of the communication control method according to the first embodiment will be described. In Step S101, the MeNB 1 establishes the S1 connection associated with the UE 4 with the MME 6 for the UE 4 which belongs to the cell 10. That is, the MeNB 1 establishes the S1 signaling bearer with the MME 6 on the S1-MME interface. Further, the MeNB 1 establishes the RRC connection with the UE 4 on the cell 10. Accordingly, the control data is transferred between the UE 4 and the MeNB 1, between the MeNB 1 and the MME 6, and between the UE 4 and the MME 6.

In Steps S102 to S107, processing for establishing the S1 bearer and the DRB via the LPN 2 is performed. In Step S102, the MeNB 1 determines to set up the data bearer in the secondary cell (SCell). The MeNB 1 sends to the MME 6 an establishment request (e.g., E-RAB SETUP message) of the E-RAB through the LPN 2 for the UE 4. Here, the secondary cell denotes the cell 20 of the LPN 2. In other words, the MeNB 1 may determine to set up a secondary cell for the UE 4. For example the MeNB 1 may determine data bearer setup in the cell 20 in response to a request from the UE 4 or a request from the EPC 5. Alternatively, the MeNB 1 may determine data bearer setup in the cell 20 in response to a notification from the UE 4 indicating that the cell 20 can be used. Alternatively, the MeNB 1 may determine data bearer setup in the cell 20 in response to an increase in the amount of user data of the UE 4 in the cell 10. Alternatively, when the cell 10 has a high load, the MeNB 1 may determine data bearer setup in the cell 20 to offload the traffic of the cell 10. Alternatively, the MeNB 1 may determine data bearer setup in the cell 20 in accordance with subscriber data of the UE 4 (e.g., category of the UE 4, contract information) received from a subscriber server (i.e., Home Subscriber Server (HSS)) via the MME 6.

In response to the establishment request of the E-RAB from the MeNB 1, the MME 6 initiates setup procedure of the S1 bearer (Step S103). More specifically, the MME 6 requests the S-GW 7 to set up the S1 bearer with the LPN 2. The S-GW 7 sets up the S1 bearer with the LPN 2 and sends to the MME 6 a response including an S1 bearer context (e.g., a tunnel endpoint identifier (TEID) and an address of the S-GW 7 in the U-plane). The TEID indicates an S-GW 7 side endpoint of the GTP tunnel as the S1 bearer.

In Step S104, the MME 6 sends the E-RAB configuration information including the S1 bearer context to the MeNB 1. The E-RAB configuration information is sent using, for example, an E-RAB SETUP RESPONSE message sent from the MME 6 to the MeNB 1.

In Step S105, the MeNB 1 sends the E-RAB configuration information to the LPN 2 via the X2/X3 signaling bearer. The E-RAB configuration information includes S1 bearer configuration information and DRB configuration information. The LPN 2 sets up the S1 bearer and the DRB in accordance with the E-RAB configuration information. The S1 bearer configuration information includes information that is necessary to establish the S1 bearer with the S-GW 7. The S1 bearer configuration information includes, for example, at least one of: an E-RAB ID; a Quality Class Indicator (QCI); the IP address of the S-GW 7; the S-GW 7 side TEID of the GTP tunnel (S1 bearer); a security key; and a Temporary Mobile Subscriber Identity (TMSI) allocated to the UE 4. The DRB configuration information includes configuration information that is necessary to establish the DRB with the UE 4. The DRB configuration information includes, for example, the E-RAB ID, the Quality Class Indicator (QCI), and configuration information of the physical layer and the MAC sublayer.

In Step S106, the MeNB 1 transmits, to the UE 4 on the SRB of the cell 10, the configuration information of the DRB on the cell 20. The configuration information of the DRB is transmitted using an RRC reconfiguration message. The UE 4 sets up the DRB in accordance with the configuration information of the DRB.

In Step S107, the MeNB 1 sends a message indicating the E-RAB setup completion (CREATE BEARER RESPONSE) to the MME 6. This message includes the configuration information on the side of the LPN 2 regarding the S1 bearer (e.g., the TEID and the address of the LPN 2). The MME 6 sends to the S-GW 7 the message including the TEID and the address of the LPN 2. The S-GW 7 updates the S1 bearer configuration by the TEID and the address of the LPN 2 received from the MME 6.

According to the above processing of Steps S102 to S107, the E-RAB which passes through the LPN 2 is configured between the UE 4 and the S-GW 7. In Step S108, the UE 4 receives or transmits user data through the cell 20 and the LPN 2.

In Step S109, the MeNB 1 keep the information regarding the LPN 2, i.e., the configuration information of the E-RAB established in the LPN 2, without releasing this information even after the E-RAB has been set up in the LPN 2. The E-RAB configuration information kept in the MeNB 1 includes the E-RAB configuration information received from the MME 6 in Step S104 to establish the E-RAB. The E-RAB configuration information kept in the MeNB 1 includes, for example, at least one of: the E-RAB ID; the QCI; the IP address of the S-GW 7; the TEID of the GTP tunnel (S1 bearer); the security key; and the TMSI allocated to the UE 4.

Second Embodiment

Figure 10:
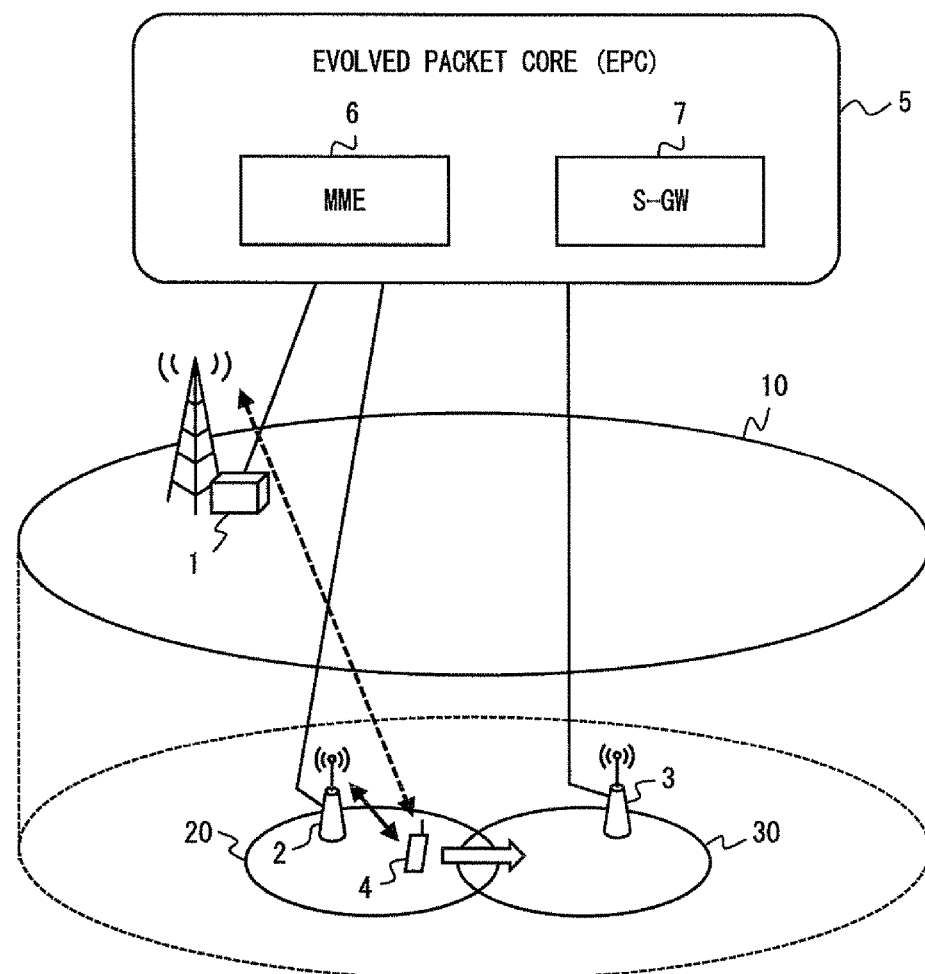
FIG. 10 is a diagram showing a configuration example of a radio communication system (e.g., LTE system) according to a second embodiment.

FIG. 10 shows a configuration example of a radio communication system according to a second embodiment. This embodiment shows an example of a movement of the UE 4 within the cell 10 of the MeNB 1. Specifically, in this embodiment, an example in which the cell 20 of the LPN 2 and a cell 30 of an LPN 3 are closely deployed in the cell 10 so that the cell 20 and the cell 30 partially overlap and the UE 4 moves from the cell 20 of the LPN 2 to the cell 30 of the LPN 3 will be described.

In this embodiment, when the endpoints of the S1 bearer and the DRB for the UE 4 are changed from the LPN 2 to the LPN 3, the MeNB 1 sends to the LPN 3 the E-RAB configuration information, which has been kept in the MeNB 1. Thanks to re-use of the E-RAB configuration information that has been kept in the MeNB 1, the MeNB 1 does not have to separately send, to the MME 6, an E-RAB establishment request or a handover request to establish the E-RAB in the LPN 3. Accordingly, it is possible in this embodiment to reduce the signaling with the MME 6 when the UE 4 moves between LPNs and to reduce a path switch delay (i.e., data bearer switching delay time) when the UE 4 moves between LPNs.

Figure 11:
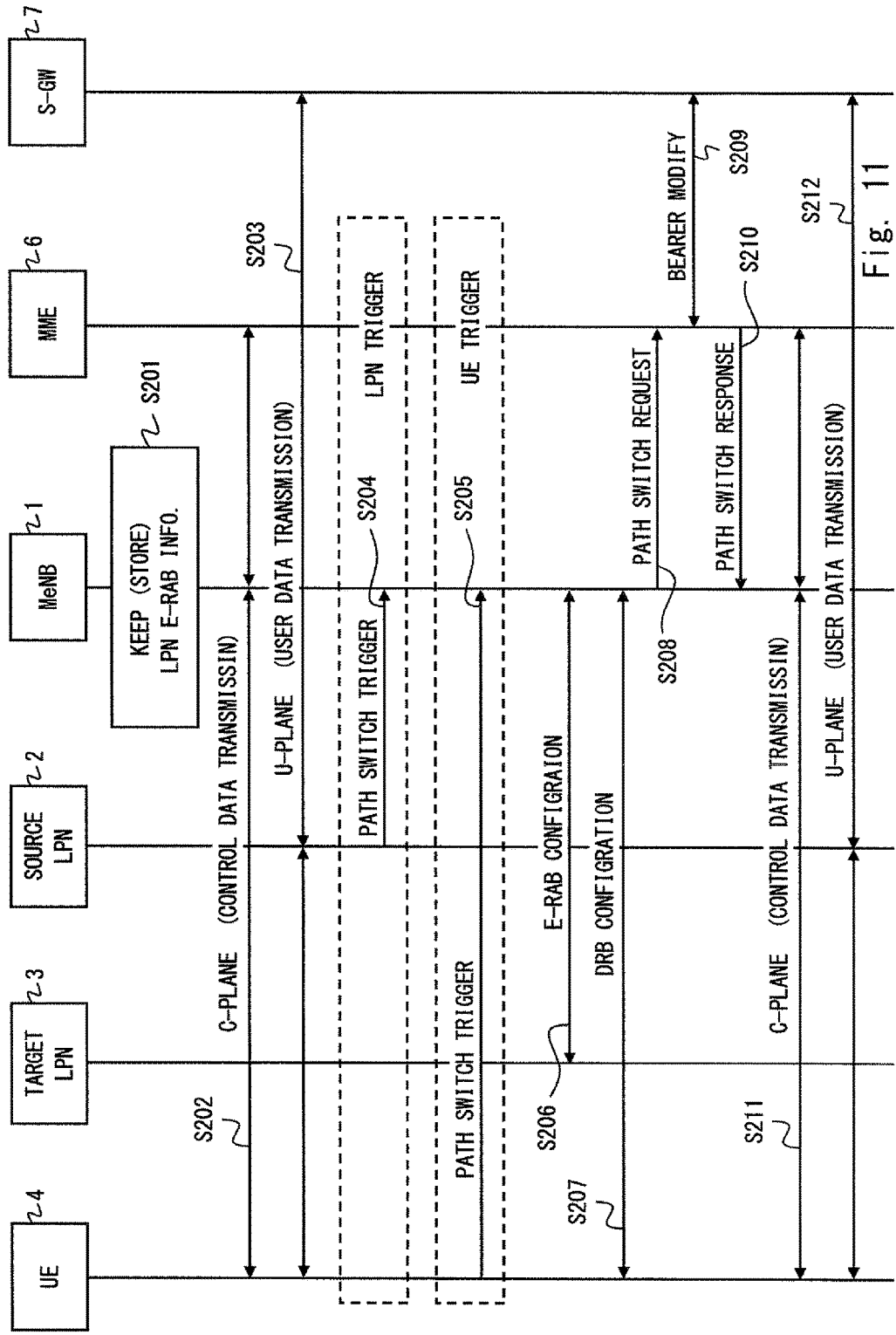
FIG. 11 is a sequence diagram showing a bearer switch procedure according to a movement of a mobile station according to the second embodiment.

FIG. 11 is a sequence diagram showing one example of the bearer switch procedure according to the movement of the UE 4 within the cell 10. Step S201 corresponds to Step S109 shown in FIG. 9. That is, the MeNB 1 holds the E-RAB configuration information regarding the E-RAB which has been established in the LPN 2. At this time, the UE 4 is located in the cell 20 of the LPN 2. Accordingly, the UE 4 transmits and receives control data through the cell 10 and the MeNB 1 (Step S202), and transmits and receives user data through the cell 20 and the LPN 20 (Step S203).

In Step S204 or S205, the MeNB 1 receives a trigger notification (PATH SWITCH TRIGGER) from the LPN 2 or the UE 4. The trigger notification includes information for the MeNB 1 to determine path switch. The MeNB 1 determines, based on the trigger notification from the LPN 2 or the UE 4, switching of the data bearer route from the LPN 2 to the LPN 3 (i.e., switching of the secondary cell (SCell)). Accordingly, in the example shown in FIG. 11, the LPN 2 is a source LPN and the LPN 3 is a target LPN.

The trigger notification from the UE 4 to the MeNB 1 may be transmitted based on radio quality of the LPN 2 measured by the UE 4 or may indicate the radio quality of the LPN 2. The UE 4 may transmit the trigger notification when the radio quality of the LPN 2 is lower than a predetermined threshold. The trigger notification from the UE 4 to the MeNB 1 may be transmitted based on radio quality of another base station (e.g., LPN 3) measured by the UE 4 or may indicate it. The UE 4 may transmit the trigger notification when the radio quality of another base station (e.g., LPN 3) exceeds a predetermined threshold. The radio quality may be, for example, downlink received power, a Signal to Interference plus Noise Ratio (SINR), Received Signal Code Power (RSCP), or Reference Signal Received Quality (RSRQ).

On the other hand, the trigger notification from the LPN 2 to the MeNB 1 may be sent based on load information indicating the load on the LPN 2 or may indicate the load information. The LPN 2 may send the trigger notification when the load on the LPN 2 exceeds a predetermined threshold. The load on the LPN 2 may be, for example, a utilization rate of radio resources in the cell 20 (e.g., utilization rate of Physical Resource Blocks (PRBs)). The trigger notification from the LPN 2 to the MeNB 1 may be sent based on a connection state of the UE 4 measured in the LPN 2 or indicate the connection state. The LPN 2 may send the trigger notification when the connection state of the UE 4 is more degraded than a reference value. The connection state of the UE 4 may be, for example, the number of occurrence or the rate of occurrence of the retransmission request from the UE 4 based on a Hybrid Automatic repeat request (ARQ).

In Step S206, the MeNB 1 sends at least a part of the E-RAB configuration information, which has been kept in the MeNB 1, to the target LPN 3. The target LPN 3 carries out the endpoint configuration of the S1 bearer and the DRB in the LPN 3 using the E-RAB configuration information received from the MeNB 1. The LPN 3 sends, to the MeNB 1, the LPN 3 side endpoint information of the S1 bearer for the UE 4. The MeNB 1 updates the E-RAB configuration information, which has been kept in the MeNB 1, in order to reflect the LPN 3 side endpoint information of the S1 bearer received from the LPN 3. In other words, the MeNB 1 generates the E-RAB configuration information in which the data bearer configuration in the LPN 3 has been reflected and continues to hold the generated E-RAB configuration information.

In Step S207, the MeNB 1 generates, based on the E-RAB configuration information that has been kept in the MeNB 1, the DRB configuration information to establish the DRB between the UE 4 and the target LPN 3. The MeNB 1 transmits the DRB configuration information to the UE 4 through the SRB on the cell 10. The UE 4 receives the DRB configuration information from the MeNB 1 and sets up the DRB on the cell 30.

Steps S208 to S210 are a procedure for switching the route of S1 bearer (i.e., procedure for switching the RAN side endpoint from the LPN 2 to the LPN 3). In Step S208, the MeNB 1 sends to the MME 6 a message (PATH SWITCH REQUEST) requesting switching of the E-RAB. This message (PATH SWITCH REQUEST) indicates that the RAN side endpoint of the S1 bearer has been changed from the LPN 2 to the LPN 3. This message (PATH SWITCH REQUEST) may include, for example, the E-RAB identifier (or S1 bearer identifier), an address of the LPN 3, and an endpoint identifier (TEID) of the S1 bearer in the LPN 3. In Step S209, the MME 6 sends a request (BEARER MODIFY) for updating the S1 bearer to the S-GW 7. The request for updating the S1 bearer includes, for example, the TEID and the address of the LPN 3. The S-GW 7 updates the S1 bearer configuration in accordance with the TEID and the address of the LPN 3 received from the MME 6. In Step S210, the MME 6 sends to the MeNB 1 a message (PATH SWITCH RESPONSE) indicating the completion of switching the route of the S1 bearer.

According to the above processing of Steps 5210 and 5211, the E-RAB that passes through the LPN 3 is configured between the UE 4 and the S-GW 7. In Step S211, the UE 4 transmits and receives control data through the cell 10 and the MeNB 1 as similar to the case in which the UE 4 communicates with the LPN 2 (Step S202). In Step S212, the UE 4 receives or transmits user data through the cell 30 and the LPN 3.

Figure 12:
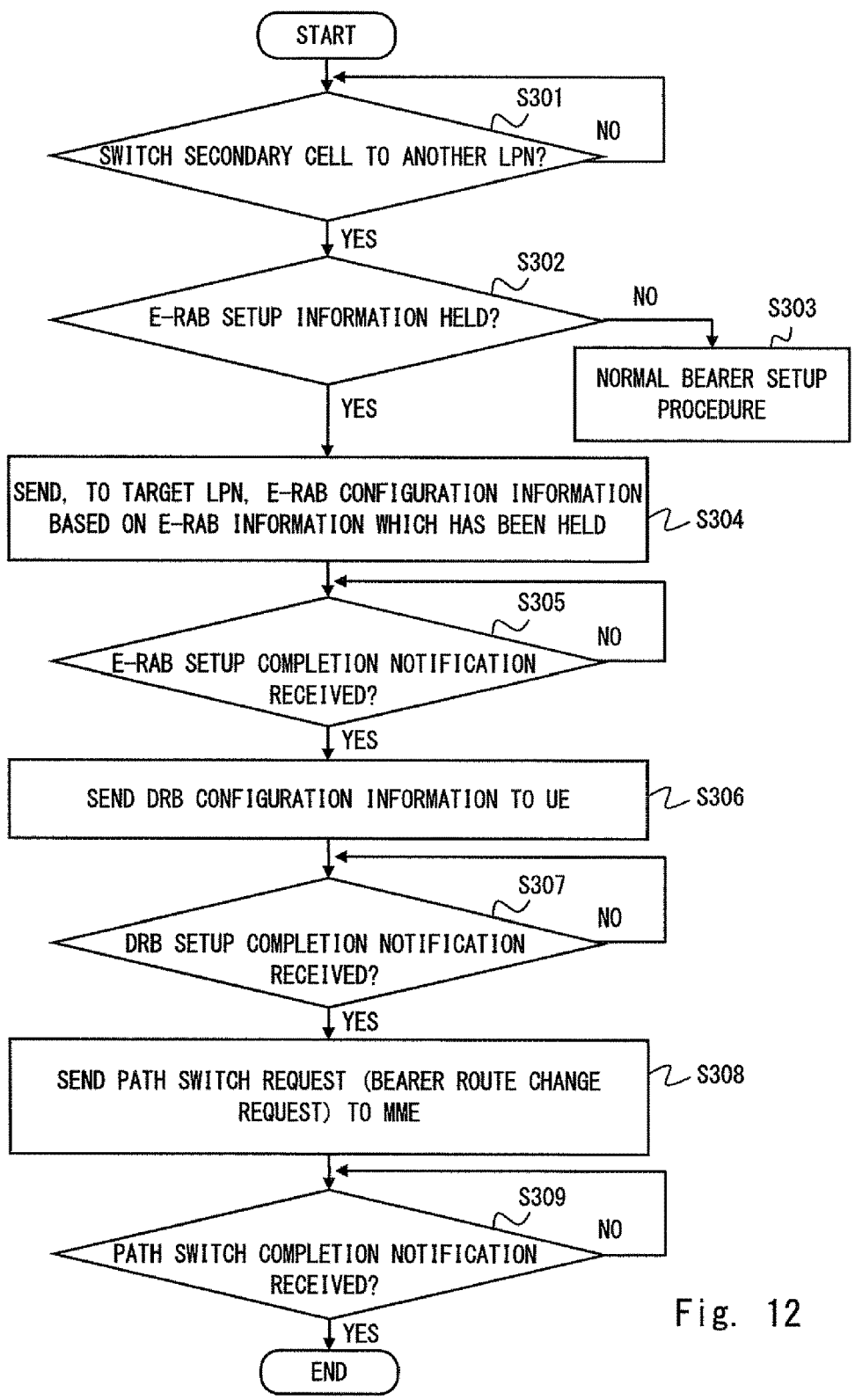
FIG. 12 is a flowchart showing an operation example of a first base station (e.g., MeNB) according to the second embodiment.

In the following description, operations of the MeNB 1, the LPNs 2 and 3, the UE 4, the MME 6, and the S-GW 7 according to the embodiment will be described. FIG. 12 is a flowchart showing an operation example of the MeNB 1. In Step S301, the MeNB 1 (controller 15) determines whether to switch the secondary cell of the UE 4 from the LPN 2 to another LPN (in this example, to the LPN 3). When the switching of the secondary cell is determined (YES in Step S301), the MeNB 1 determines whether the MeNB 1 already holds the E-RAB configuration information (Step S302). When the MeNB 1 does not hold the E-RAB configuration information (NO in Step S302), the MeNB 1 executes the normal bearer setup procedure (e.g., handover procedure) and switches the data bearer for the UE 4 from the LPN 2 to the LPN 3 (Step S303). On the other hand, when the MeNB 1 already holds the E-RAB configuration information (YES in Step S302), the MeNB 1 performs the processing of Step S304 and the following processing.

In Step S304, the MeNB 1 sends to the target LPN 3 the E-RAB configuration information based on the E-RAB configuration information that has been kept in the MeNB 1 (i.e., E-RAB configuration information regarding the LPN 2). In Step S305, the MeNB 1 determines whether the E-RAB setup completion notification has been received from the target LPN 3. When the E-RAB setup completion notification has been received (YES in Step S305), the MeNB 1 generates DRB configuration information in which the DRB configuration in the LPN 3 has been reflected and transmits the generated DRB configuration information to the UE 4 (Step S306). In Step S307, the MeNB 1 determines whether the DRB setup completion notification has been received from the UE 4. When the DRB setup completion notification has been received (YES in Step S307), the MeNB 1 sends a path switch request (i.e., request for switching the route of the S1 bearer) to the MME 6 (Step S308). When the path switch completion notification is received from the MME 6, the MeNB 1 completes the processing of FIG. 12 (Step S309).

Figure 13:
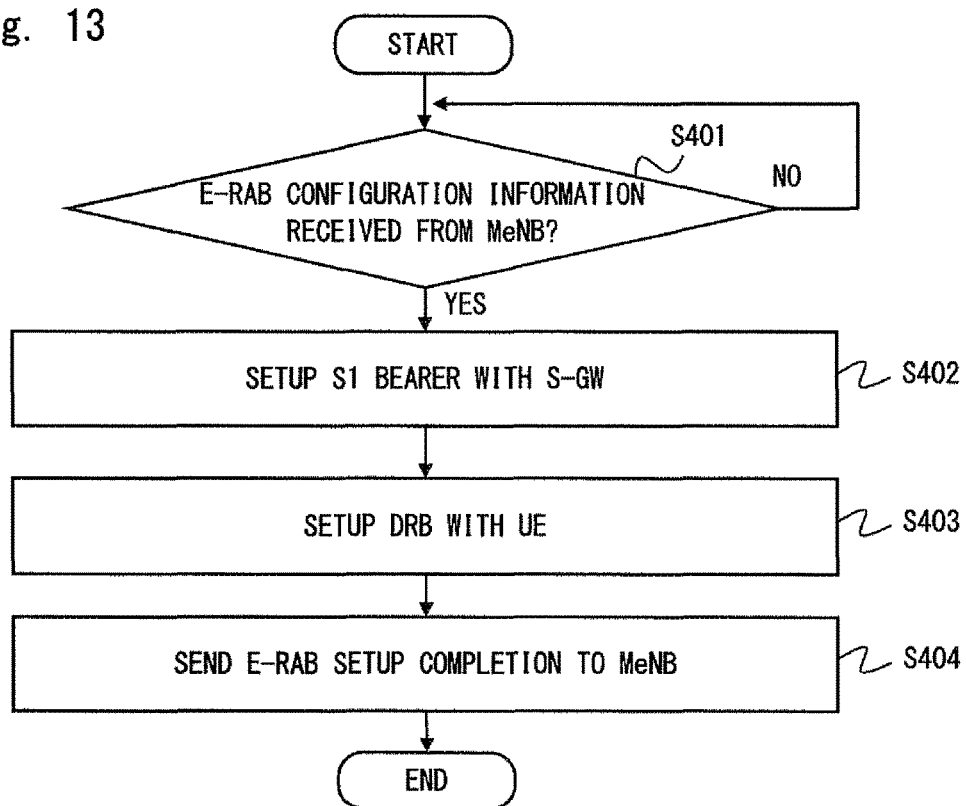
FIG. 13 is a flowchart showing an operation example of a second base station (e.g., LPN) according to the second embodiment.

FIG. 13 is a flowchart showing an operation example of the LPNs 2 and 3. While the LPN 2 will be described in the following description, the operation of the LPN 3 is similar to that of the LPN 2. In Step S401, the LPN 2 (controller 25) determines whether the E-RAB configuration information has been received from the MeNB 1. When the E-RAB configuration information has been received (YES in Step S401), the LPN 2 sets up the S1 bearer with the S-GW 7 and the DRB with the UE 4 in accordance with the received E-RAB configuration information (Steps S402 and S403). In Step S404, the LPN 2 notifies the MeNB 1 of the E-RAB configuration completion.

Figure 14:
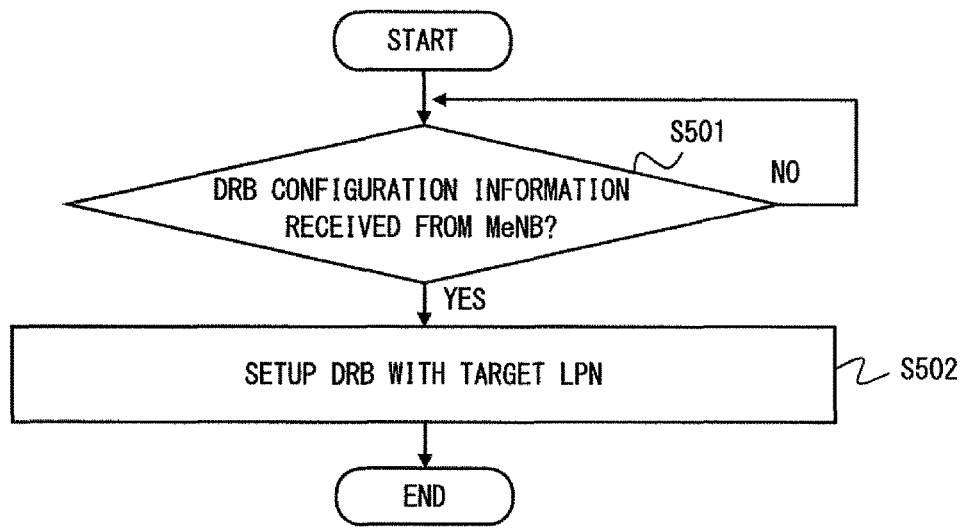
FIG. 14 is a flowchart showing an operation example of a mobile station (e.g., UE) according to the second embodiment.

FIG. 14 is a flowchart showing an operation example of the UE 4. In Step S501, the UE 4 (controller 45) receives the DRB configuration information from the MeNB 1. In Step S502, the UE 4 sets up the DRB (e.g., the DRB with the LPN 20 in the cell 20 or the DRB with the LPN 3 in the cell 30) in accordance with the DRB configuration information.

Figure 15:
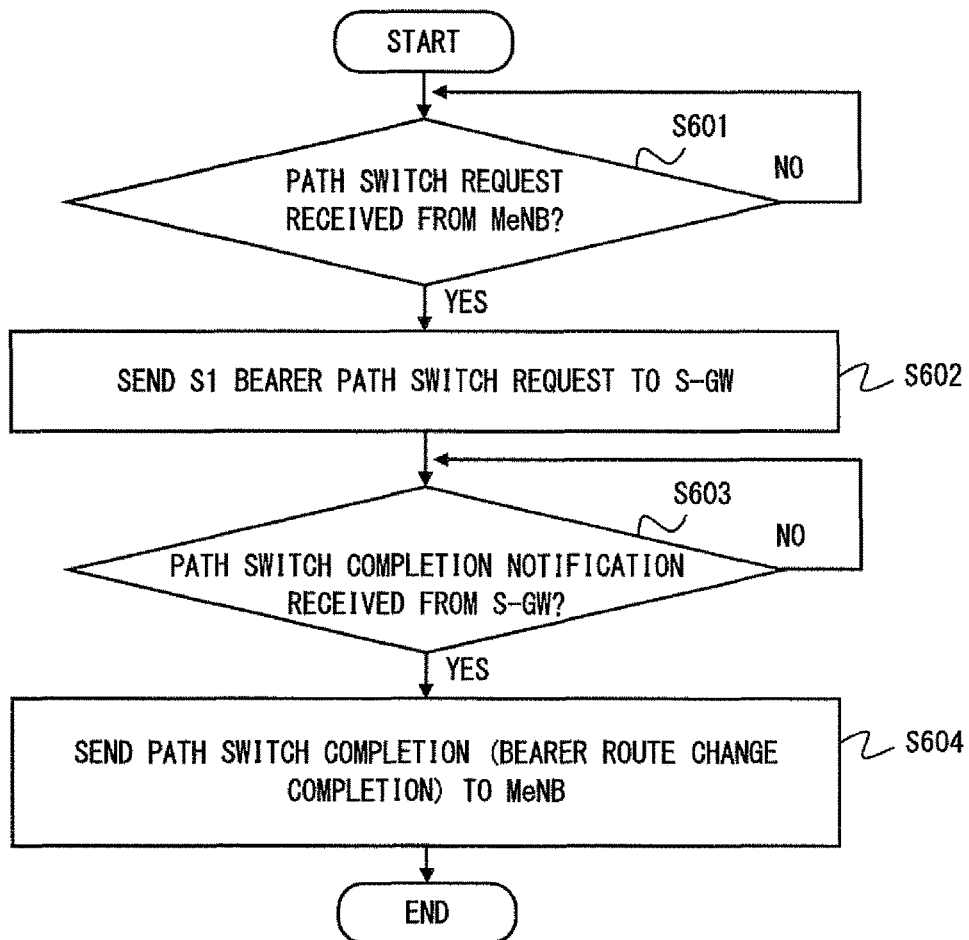
FIG. 15 is a flowchart showing an operation example of a mobility management apparatus (e.g., MME) according to the second embodiment.

FIG. 15 is a flowchart showing an operation example of the MME 6. In Step S601, the MME 6 (bearer setup controller 62) determines whether the path switch request has been received from the MeNB 1. When the path switch request has been received (YES in Step S601), the MME 6 sends the request for changing the route of the S1 bearer (i.e., a bearer update request (BEARER MODIFY)) to the S-GW 7 (Step S602). In Step S603, the MME 6 determines whether the notification of the completion of the change in the route of the S1 bearer has been received from the S-GW 7. When the completion notification has been received (YES in Step S603), the MME 6 notifies the MeNB 1 of the completion of the path switch (i.e., completion of the switch of the route of the S1 bearer) (Step S604).

Figure 16:
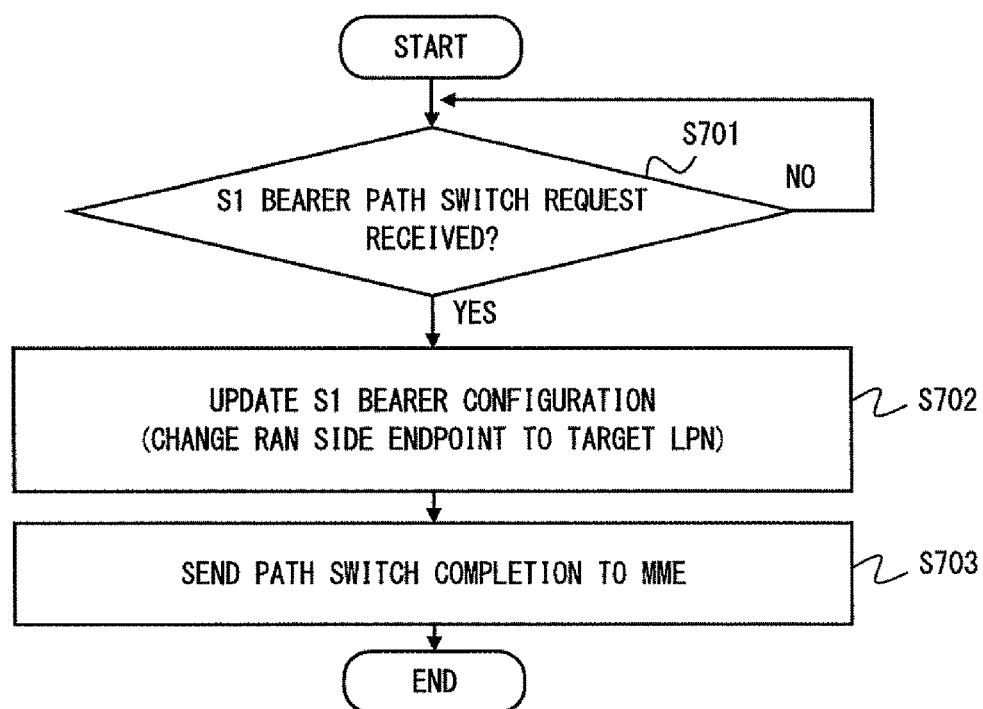
FIG. 16 is a flowchart showing an operation example of a data transfer apparatus (e.g., S-GW) according to the second embodiment.

FIG. 16 is a flowchart showing an operation example of the S-GW 7. In Step S701, the S-GW 7 (bearer controller 75) determines whether the request for changing the route of the S1 bearer (i.e., a bearer update request) has been received from the MME 6. The request for changing the route of the S1 bearer indicates that the RAN side endpoint of the S1 bearer for the UE 4 is changed from the LPN 2 to the LPN 3. When the request for changing the route of the S1 bearer has been received (YES in Step S701), the S-GW 7 updates the configuration of the S1 bearer for the UE 4 in accordance with the S1 bearer configuration information (Step S702). That is, the S-GW 7 changes the RAN side endpoint of the S1 bearer for the UE 4 to the LPN 3. In Step S703, the S-GW 7 notifies the MME 6 of the completion of the route change (update completion) of the S1 bearer.

Third Embodiment

Figure 17:
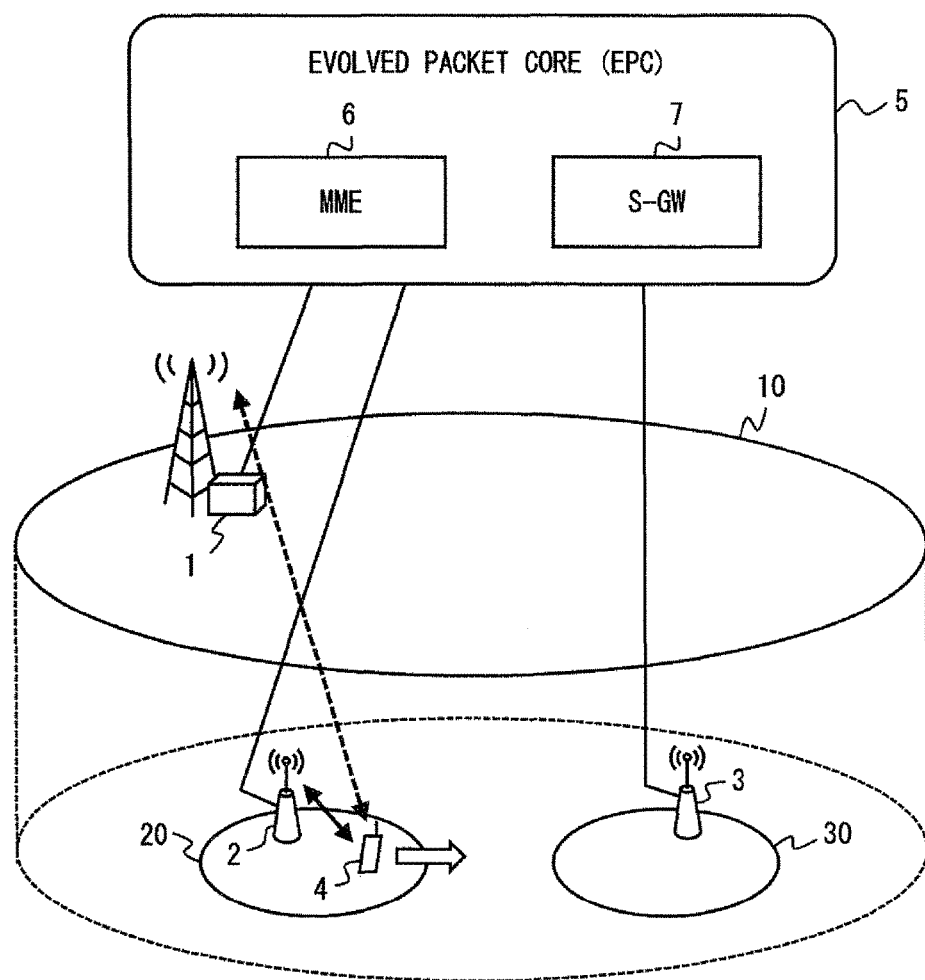
FIG. 17 is a diagram showing a configuration example of a radio communication system (e.g., LTE system) according to a third embodiment.

FIG. 17 shows a configuration example of a radio communication system according to a third embodiment. This embodiment shows an example of the movement of the UE 4 within the cell 10 of the MeNB 1. Specifically, in this embodiment, at least one LPN including the LPN 2 is sparsely deployed in the MeNB cell 10, and the LPN cell 20 does not overlap another LPN cell (e.g., LPN cell 30). Accordingly, in this embodiment, an example in which the data bearer for the UE 4 is changed from a route that passes through the LPN 2 to a route that passes through the MeNB 1 will be described.

In this embodiment, when the endpoints of the S1 bearer and the

DRB for the UE 4 are changed from the LPN 2 to the MeNB 1, the MeNB 1 establishes the S1 bearer and the DRB in the MeNB 1 by re-using the E-RAB configuration information that has been kept in the MeNB 1. Since the E-RAB configuration information that has been kept in the MeNB 1 is re-used, the MeNB 1 need not send to the MME 6 an E-RAB establishment request or a handover request to establish the E-RAB in the MeNB 1. It is thus possible in this embodiment to reduce signaling with the MME 6 when the UE 4 moves from the LPN 2 to the MeNB 1 and to reduce a path switch delay when the UE 4 moves between cells (i.e., data bearer switching delay time).

When the DRB for the UE 4 is established in the MeNB 1, this DRB may be configured on the cell 10 or may be configured on a cell (secondary cell) of the MeNB 1 different from the cell 10. When the DRB for the UE 4 is configured on the cell 10, this cell operation mode is a typical mode in which the same cell provides the C-Plane and the U-Plane. On the other hand, when the DRB for the UE 4 is configured on a cell of the MeNB 1 different from the cell 10, this cell operation mode corresponds to a so-called inter-base station carrier aggregation (Intra-eNB Carrier Aggregation).

Figure 18:
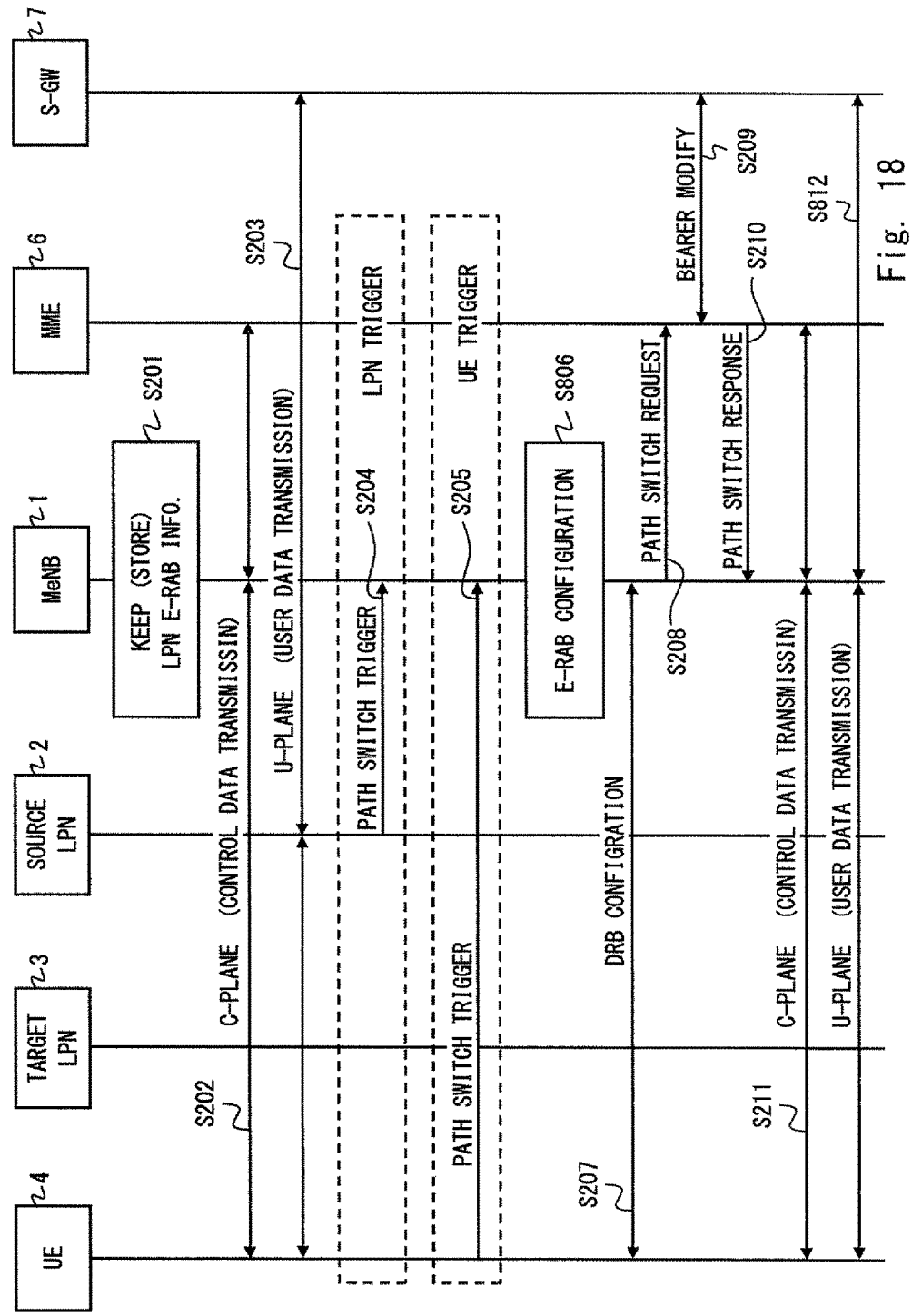
FIG. 18 is a sequence diagram showing a bearer switch procedure according to a movement of a mobile station according to the third embodiment.

FIG. 18 is a sequence diagram showing one example of the bearer switch procedure according to the movement of the UE 4 within the cell 10. The processing in Steps S201 to S205 shown in FIG. 18 is similar to the processing in Steps S201 to S205 shown in FIG. 11. Specifically, the MeNB 1 determines, based on the trigger notification in Step S204 or S205, switching of the data bearer route from the LPN 2 to the MeNB 1. In Step S806, the MeNB 1 sets up the DRB and the S1 bearer for the UE 4 in the MeNB 1 by re-using at least a part of the E-RAB configuration information that has been kept in the MeNB 1. The processing in Steps S207 to S211 shown in FIG. 18 is similar to that in Steps S207 to S211 shown in FIG. 11. That is, the MeNB 1 transmits to the UE 4 the DRB configuration information to establish the DRB between the UE 4 and the MeNB 1. The MeNB 1 then requests the MME 6 to switch the route of the S1 bearer. In Step S812 shown in FIG. 18, the UE 4 receives or transmits user data through the cell 10 or another cell of MeNB 1.

Figure 19:
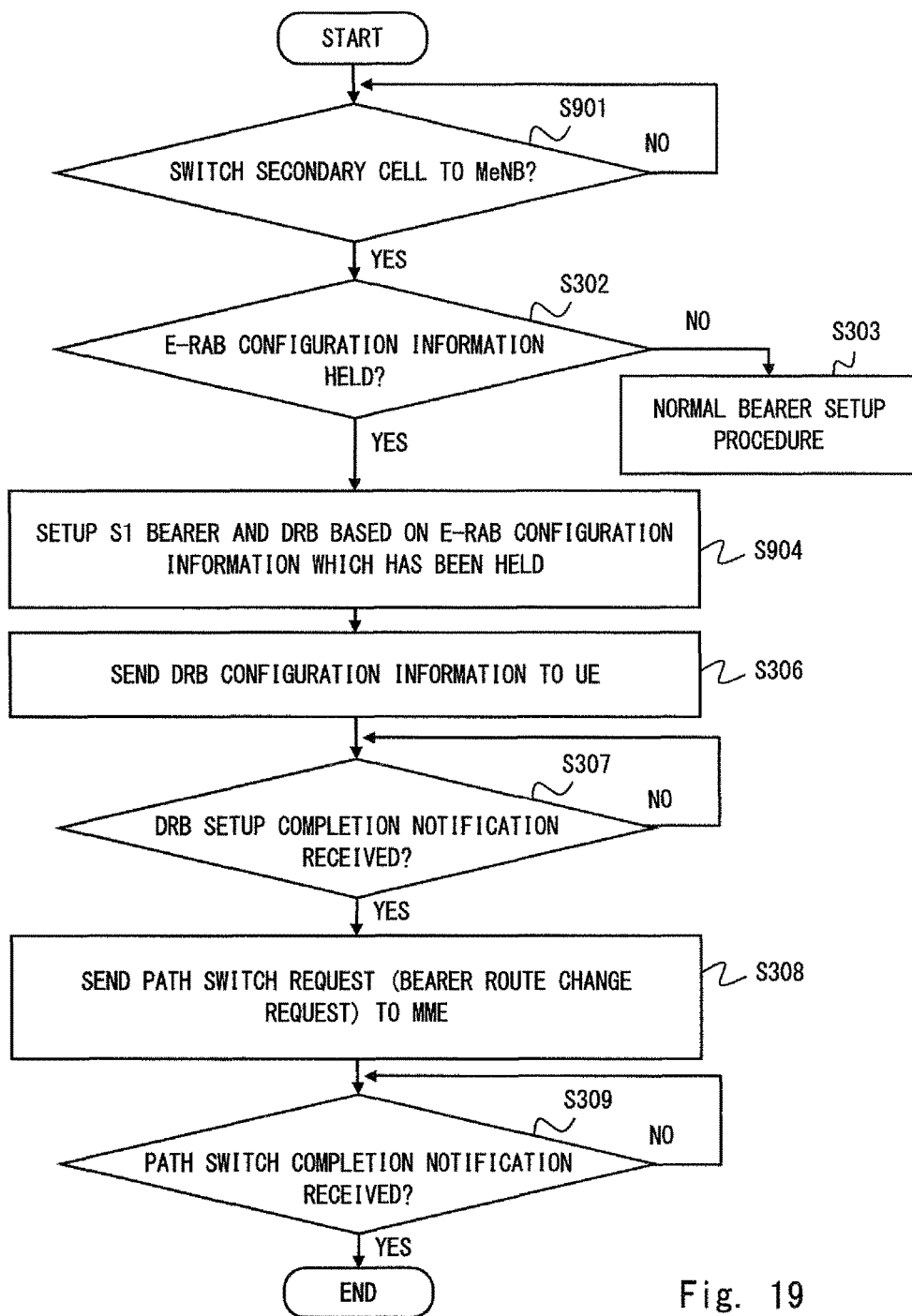
FIG. 19 is a flowchart showing an operation example of a first base station (e.g., MeNB) according to the third embodiment.

FIG. 19 is a flowchart showing an operation example of the

MeNB 1 according to the embodiment. In Step S901, the MeNB 1 (controller 15) determines whether to switch the secondary cell for the UE 4 from the LPN 2 to the MeNB 1. The processing in Steps S302 and S303 shown in FIG. 19 is similar to that in Steps S302 and S303 shown in FIG. 12 except that the secondary cell is switched to the MeNB 1 not to the LPN 3. In Step S904, the MeNB 1 sets up the DRB and the S1 bearer for the UE 4 in the MeNB 1 by re-using the E-RAB configuration information that has been kept in the MeNB 1 (i.e., E-RAB configuration information regarding the LPN 2). The processing in Steps S305 to S309 shown in FIG. 19 is similar to that in Steps S305 to S309 shown in FIG. 12 except that the secondary cell is switched to the MeNB 1 not to the LPN 3.

Fourth Embodiment

Figure 20:
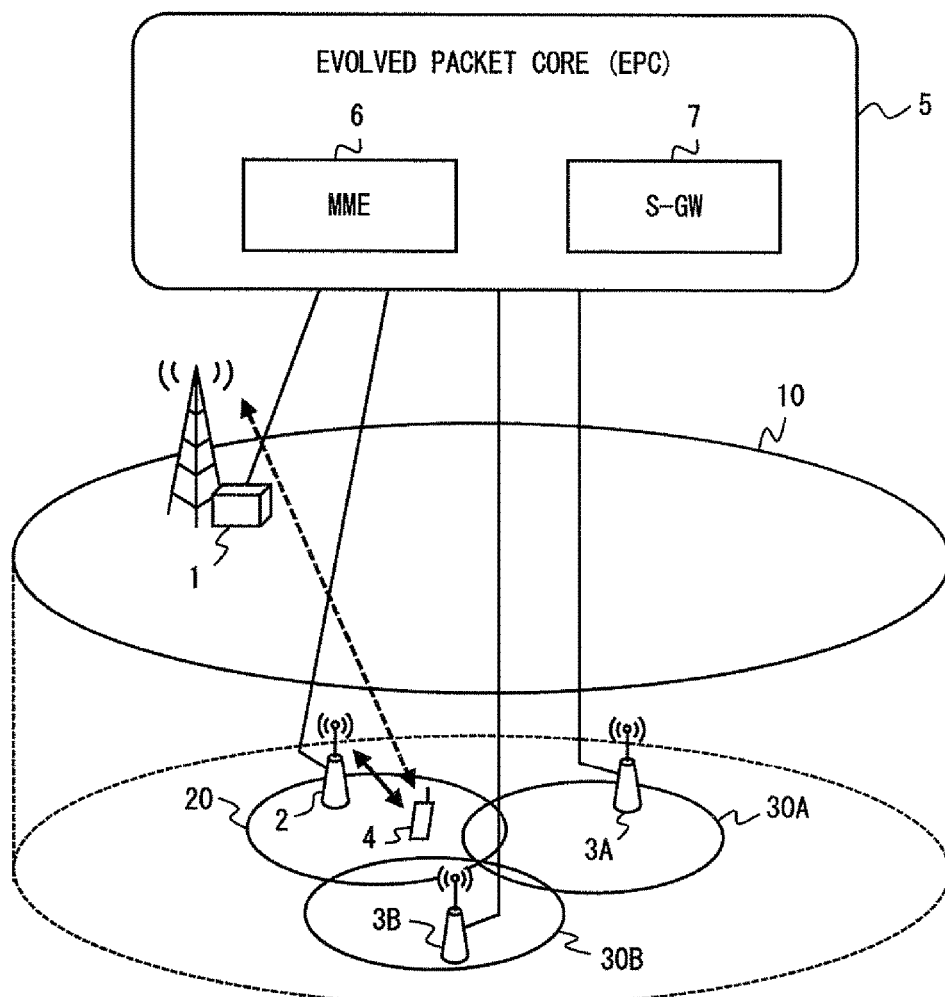
FIG. 20 is a diagram showing a configuration example of a radio communication system (e.g., LTE system) according to a fourth embodiment.

FIG. 20 shows a configuration example of a radio communication system according to a fourth embodiment. This embodiment shows a modified example of the second embodiment. Specifically, in this embodiment, there are candidate LPNs 3A and 3B to which the S1 bearer and the DRB for the UE 4 established in the LPN 2 can be switched. The MeNB 1 notifies the candidate LPNs 3A and 3B of the E-RAB configuration information preliminary to determining that the S1 bearer and the DRB for the UE 4 should be changed from the LPN 2 to another LPN. The MeNB 1 then determine a target LPN to which the data bearer is to be switched (e.g., the LPN 3A), and instruct the target LPN (LPN 3A) to activate the data bearer. It is thus possible to enable the candidate LPNs to perform at least a part of the configuration regarding the DRB and the S1 bearer for the UE 4 in advance using the E-RAB configuration information received from the MeNB 1. Accordingly, in this embodiment, it is possible to further reduce the path switch delay (i.e., data bearer switching delay time) when the UE 4 moves between cells.

Figure 21:
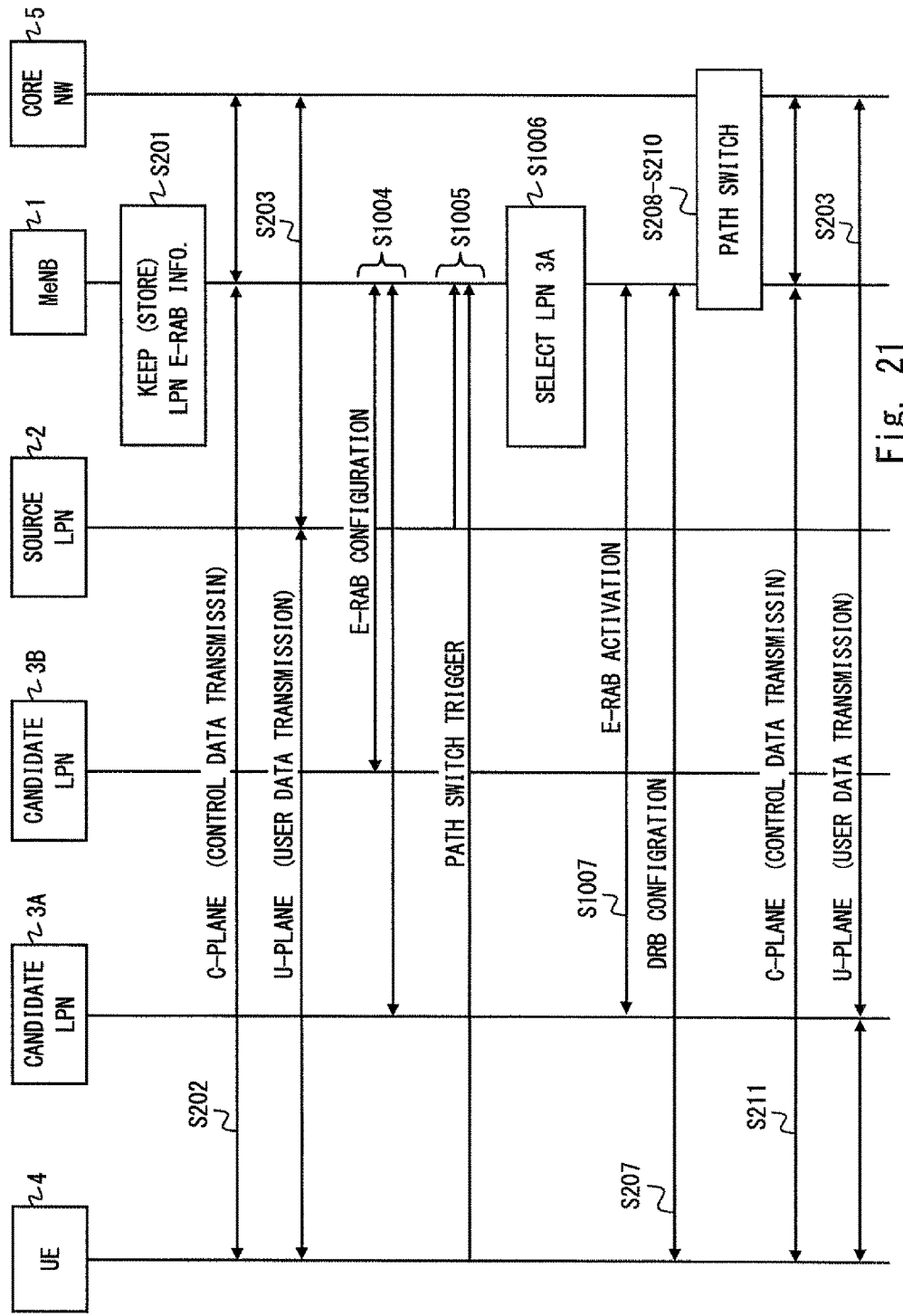
FIG. 21 is a sequence diagram showing a bearer switch procedure according to a movement of a mobile station according to the fourth embodiment.

FIG. 21 is a sequence diagram showing one example of the bearer switch procedure according to the movement of the UE 4 within the cell 10. The processing in Steps S201 to S203 shown in FIG. 21 is similar to the processing in Steps S201 to S203 shown in FIG. 11. In Step S1004 shown in FIG. 21, the MeNB 1 sends the E-RAB configuration information, which has been kept in the MeNB 1, to the plurality of candidate LPNs 3A and 3B. The processing in Step S1005 is similar to that in Steps S204 and S205 shown in FIG. 11. Specifically, the MeNB 1 receives the trigger notification from the LPN 2 or the UE 4.

In Step S1006, the MeNB 1 determines the target LPN from the plurality of candidate LPNs 3. The target LPN is the destination to which the endpoints of the DRB and the S1 bearer for the UE 4 that has been established in the LPN 2 (source LPN) are to be switched. The MeNB 1 may select, as the target LPN, a candidate LPN that satisfies a predetermined condition from the plurality of candidate LPNs. The predetermined condition relates to, for example, at least one of (a) radio quality of each candidate LPN measured by the UE 4, (b) load on each candidate LPN, and (c) moving speed of the UE 4. The MeNB 1 may receive the radio quality information of each candidate LPN or load information of each candidate LPN from each candidate base station. The MeNB 1 may receive radio quality information of each candidate LPN from the UE 4. In some implementation, the MeNB 1 may collect load information of each candidate LPN and select, as the target LPN, a candidate LPN whose load is below a predetermined threshold. Alternatively, the MeNB 1 may collect radio quality information of each candidate LPN and select, as the target LPN, a candidate LPN whose radio quality exceeds a predetermined threshold.

In Step S1007, the MeNB 1 sends the bearer activation information (E-RAB ACTIVATION) to the target LPN selected from the plurality of candidate LPNs. In the example shown in FIG. 21, the LPN 3A is selected as the target LPN. In response to receiving the bearer activation information, the LPN 3A sets up the DRB for the UE 4 in the cell 30A. The processing in S207 to S211 shown in FIG. 21 is similar to the processing in Steps S207 to S211 shown in FIG. 11.

Figure 22:
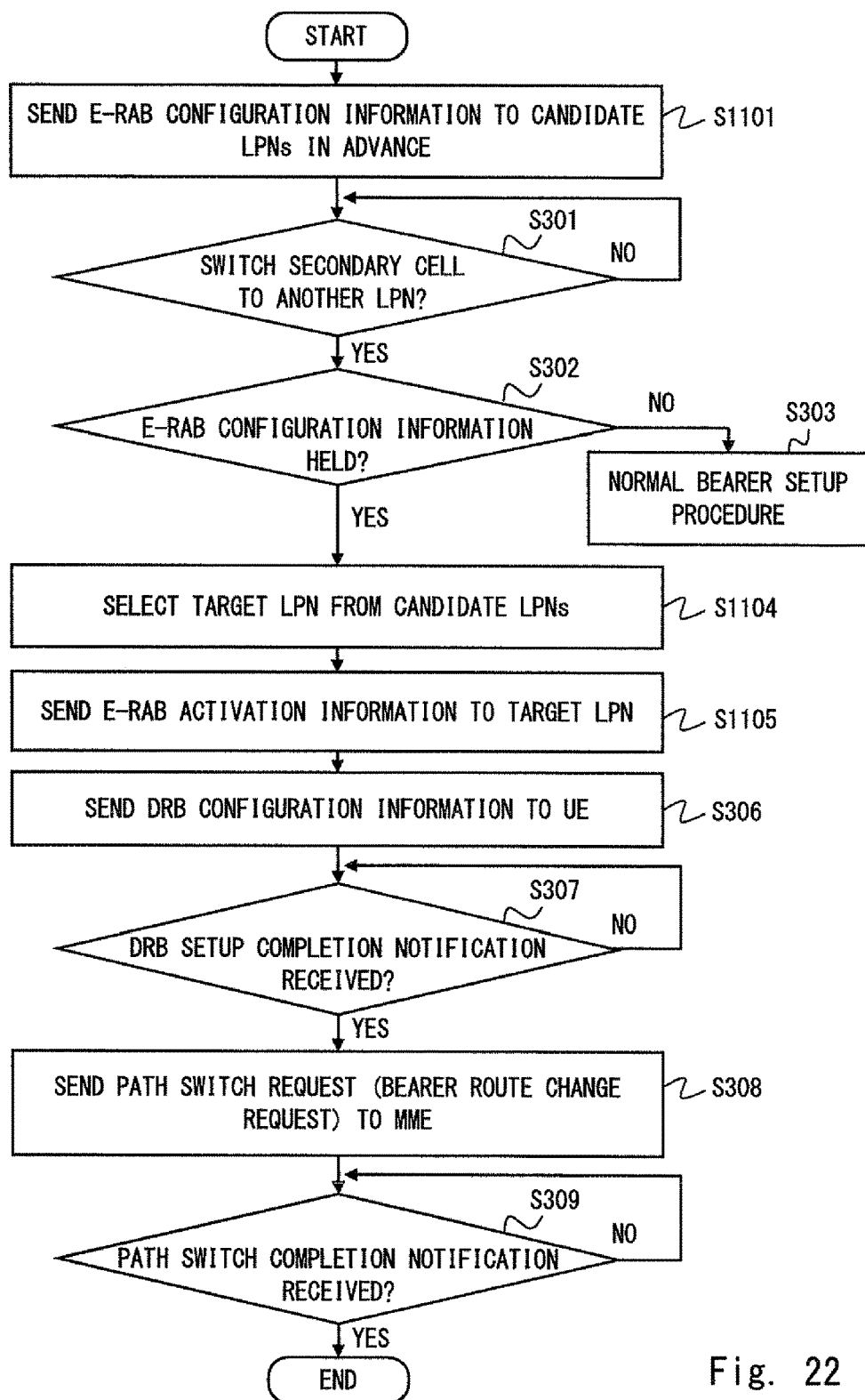
FIG. 22 is a flowchart showing an operation example of a first base station (e.g., MeNB) according to the fourth embodiment.

FIG. 22 is a flowchart showing an operation example of the MeNB 1 according to this embodiment. In Step S1101, the MeNB 1 (controller 15) preliminarily sends, to the candidate LPN, the E-RAB configuration information regarding the E-RAB which has been configured in the LPN 2. The processing in Steps S301 to S303 shown in FIG. 22 is similar to the processing in Steps S301 to S303 shown in FIG. 12. In Step S1104, the MeNB 1 selects the target LPN from the plurality of candidate LPNs. In Step S1105, the MeNB 1 sends E-RAB activation information to the target LPN. The processing in Steps S306 to S309 shown in FIG. 22 is similar to the processing in Steps S306 to S309 shown in FIG. 12.

Figure 23:
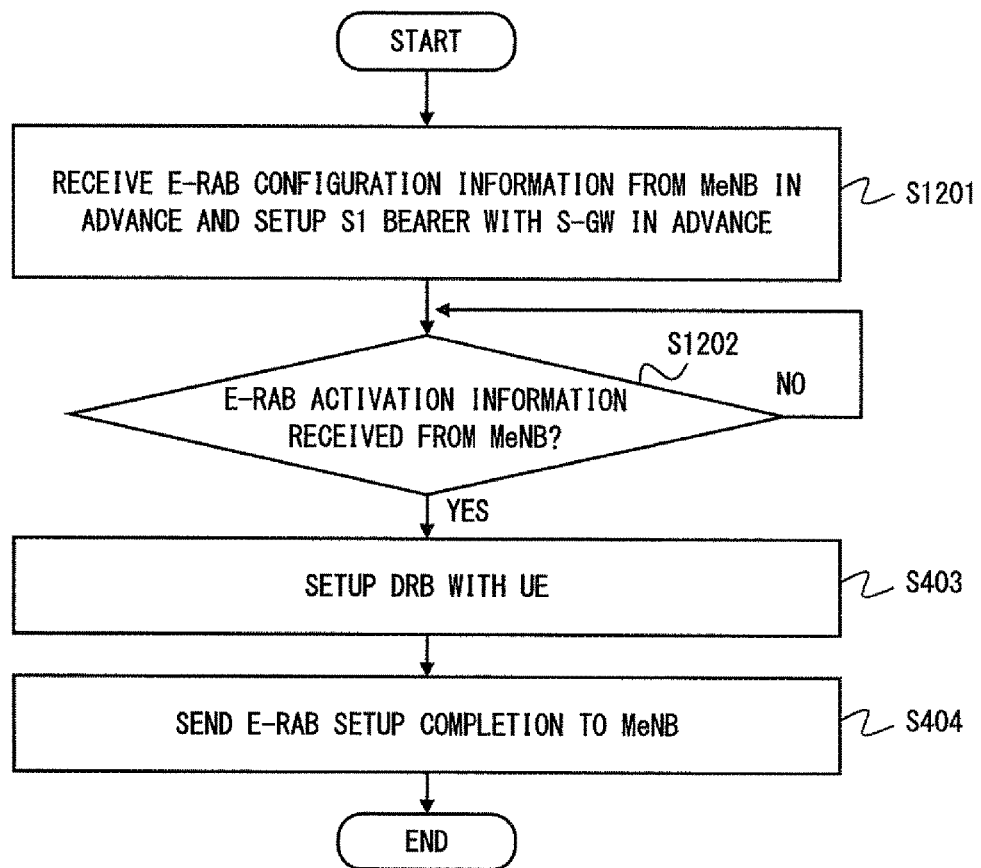
FIG. 23 is a flowchart showing an operation example of a second base station (e.g., LPN) according to the fourth embodiment.

FIG. 23 is a flowchart showing an operation example of the candidate LPN, i.e., the LPN 3A (or 3B), according to this embodiment. In Step S1201, the LPN 3A receives the E-RAB configuration information from the MeNB 1 in advance and sets up the S1 bearer with the S-GW 7 in advance. In Step S1202, the LPN 3A determines whether the E-RAB activation information has been received from the MeNB 1. The processing in Steps S403 and S404 shown in FIG. 23 is similar to the processing in Steps S403 and S404 shown in FIG. 13. That is, when the E-RAB activation information has been received (YES in Step S1202), the LPN 3A sets up the DRB with the UE 4 on the cell 30A (Step S403). The LPN 3A notifies the MeNB 1 of the E-RAB setup completion.

Other Embodiments

The above first to fourth embodiments may be appropriately combined. For example, the second and third embodiments may be combined with each other or the third and fourth embodiments may be combined with each other. In this case, the MeNB 1 may determine whether the endpoints of the DRB and the S1 bearer for the UE 4 are changed to the MeNB 1 or to the LPN 3, based on the moving speed of the UE 4 or the frequency of the movement between cells. For example, when the moving speed or frequency of inter-cell movement of the UE 4 exceeds a predetermined threshold, the MeNB 1 may select the MeNB 1 as the destination to which the bearer endpoints for the UE 4 to be changed. It is thus possible to suppress frequent occurrence of processing for changing the bearer route which occurs due to a frequent movement of the UE 4 between LPNs. On the other hand, when the moving speed or frequency of inter-cell movement of the UE 4 is below a predetermined threshold, the MeNB 1 may select the LPN 3 as the destination to which the bearer endpoints for the UE 4 to be changed.

All the communication control methods in the C/U-plane split scenario by the MeNB 1, the LPN 2, the LPN 3, the UE 4, the MME 6, and the S-GW 7 described in the first to fourth embodiments may be implemented by using a semiconductor processing device including an Application Specific Integrated Circuit (ASIC). Alternatively, these methods may be implemented by causing a computer system including at least one processor (e.g., microprocessor, Micro Processing Unit (MPU), Digital Signal Processor (DSP)) to execute a program. Specifically, one or more programs including instructions for causing a computer system to perform the algorithms shown in the flowcharts and the sequence diagrams may be created and these programs may be supplied to a computer.

These programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). These programs may be provided to a computer using any type of transitory computer readable media. Examples of transitory computer readable media include electric signals, optical signals, and electromagnetic waves. Transitory computer readable media can provide a program to a computer via a wired communication line (e.g., electric wires, and optical fibers) or a wireless communication line.

In the above first to fourth embodiments, the LTE system has been mainly described. However, these embodiments may be applied to radio communication systems other than the LTE system, for example, a 3GPP Universal Mobile Telecommunications System (UMTS), a 3GPP2 CDMA2000 system (1xRTT, High Rate Packet Data (HRPD)), a Global System for Mobile Communications (GSM) system, or a WiMAX system.

Further, the above embodiments are merely examples of applications of technical ideas obtained by the present inventors. Needless to say, these technical ideas are not limited to the above embodiments and may be changed in various ways.

This application is based upon and claims the benefit of priority from Japanese Patent Application No. 2012-288209, filed on Dec. 28, 2012, the disclosure of which is incorporated herein in its entirety by reference.

REFERENCE SIGNS LIST

1 Base Station (MenB)
2 Base Station (LPN)
3, 3a, 3b Base Stations (LPNs)
4 Mobile Station (UE)
5 Core Network (EPC)
6 Mobility Management Apparatus (MME)
7 Data Transfer Apparatus (S-GW)
15 Controller
25 Controller
45 Controller
62 Bearer Setup Controller
75 Bearer Controller
80 Tunnel

The invention claimed is:

1. A radio communication system comprising:
a first base station that operates a first cell;
a second base station that operates a second cell;
a core network comprising a mobility management apparatus and a data transfer apparatus; and
a mobile station, wherein
the first base station is configured to establish a first signaling bearer with the mobility management apparatus, establish a second signaling bearer with the second base station, and establish a signaling radio bearer with the mobile station in the first cell,
the second base station is configured to establish the second signaling bearer with the first base station, establish a data bearer with the data transfer apparatus, and establish a data radio bearer with the mobile station in the second cell,
the first base station is further configured to:
send, to the second base station via the second signaling bearer, first configuration information for establishing the data bearer and the data radio bearer in the second base station,
keep the first configuration information in the first base station even after the data bearer and the data radio bearer are established in the second base station; and
when an endpoint of the data radio bearer and an endpoint of the data bearer are changed from the second base station to a third base station:
send the first configuration information, which has been kept in the first base station, to the third base station, and
send a message including an address and a Tunnel Endpoint Identifier (TEID) of the third base station to the mobility management apparatus.

2. The radio communication system according to claim 1, wherein the first base station is configured to:
when the data radio bearer and the data bearer are established in the second base station, receive from the mobility management apparatus the first configuration information as a response to a request for establishing the data bearer sent from the first base station to the mobility management apparatus, and
when the endpoint of the data radio bearer and the endpoint of the data bearer are changed from the second base station to the third base station, send the first configuration information, which has been kept in the first base station, to the third base station without sending a request for establishing the data bearer to the mobility management apparatus.

3. The radio communication system according to claim 1, wherein the first base station is configured to notify the mobility management apparatus of endpoint information of the data bearer whose endpoint has been changed to the third base station.

4. The radio communication system according to claim 1, wherein the first base station is configured to keep second configuration information generated by updating the first configuration information using information of the third base station even after the endpoint of the data radio bearer and the endpoint of the data bearer have been changed to the third base station.

5. The radio communication system according to claim 1, wherein the first base station is configured to receive, from the third base station, endpoint information of the data bearer whose endpoint has been changed to the third base station.

6. The radio communication system according to claim 1, wherein the first base station is configured to, when the endpoint of the data radio bearer and the endpoint of the data bearer are changed from the second base station to the third base station, generate, based on the first configuration information, third configuration information to establish the data radio bearer between the mobile station and the third base station and transmits the third configuration information to the mobile station via the signaling radio bearer.

7. The radio communication system according to claim 1, wherein
the first base station is configured to send the first configuration information to a plurality of candidate base stations including the third base station before the third base station is selected as a base station to which the data bearer and the data radio bearer are switched, and the first base station is configured to instruct the third base station to activate the data bearer after the third base station is selected.

8. The radio communication system according to claim 7, wherein the first base station is configured to select, as the third base station, a candidate base station which satisfies a predetermined condition from the plurality of candidate base stations.

9. The radio communication system according to claim 8, wherein the predetermined condition relates to at least one of: (a) radio quality of each candidate base station measured by the mobile station; (b) load on each candidate base station; and (c) moving speed of the mobile station.

10. The radio communication system according to claim 9, wherein the first base station is configured to receive at least one of the radio quality and the load from each candidate base station.

11. The radio communication system according to claim 1, wherein the first base station is configured to, when the endpoint of the data radio bearer and the endpoint of the data bearer are changed from the second base station to the first base station, establish the data bearer and the data radio bearer in the first base station by re-using the first configuration information that has been kept in the first base station.

12. The radio communication system according to claim 11, wherein
the first base station is configured to, when the data radio bearer and the data bearer are established in the second base station, receive from the mobility management apparatus the first configuration information as a response to a request for establishing the data bearer sent from the first base station to the mobility management apparatus, and
the first base station is configured to, when the endpoint of the data radio bearer and the data bearer is changed from the second base station to the first base station, establish the data bearer and the data radio bearer in the first base station by using the first configuration information, which has been kept in the first base station, without sending a request for establishing the data bearer to the mobility management apparatus.

13. The radio communication system according to claim 11, wherein the first base station is configured to determine, based on a moving speed of the mobile station, whether the endpoint of the data radio bearer and the endpoint of the data bearer are changed to the first base station or another base station.

14. The radio communication system according to claim 1, wherein the first base station is configured to determine to change the endpoint of the data radio bearer and the endpoint of the data bearer, in response to a trigger notification from the second base station or the mobile station.

15. The radio communication system according to claim 1, wherein the mobile station is configured to transmit or receive user data via the data radio bearer without establishing a signaling radio bearer with the second base station.

16. The radio communication system according to claim 1, wherein a non-access stratum control message is transferred between the core network and the mobile station via the first signaling bearer and the signaling radio bearer.

17. The radio communication system according to claim 1, wherein the first configuration information comprises at least one of an identifier of the data bearer, QoS information of the data bearer, an address of the data transfer apparatus, a tunnel endpoint identifier of the data transfer apparatus, and an identifier of the mobile station.

18. A first base station comprising:
a controller configured to:
perform control to establish a first signaling bearer with a mobility management apparatus in a core network, establish a second signaling bearer with a second base station that operates a second cell, and establish a signaling radio bearer with a mobile station in the first cell;
send, to the second base station via the second signaling bearer, first configuration information for establishing a data bearer and a data radio bearer in the second base station, wherein the data bearer is established between the second base station and a data transfer apparatus in the core network, and the data radio bearer is established between the second base station and the mobile station in the second cell;
keep the first configuration information even after the data bearer and the data radio bearer are established in the second base station;
when an endpoint of the data radio bearer and an endpoint of the data bearer are changed from the second base station to a third base station:
send the first configuration information, which has been kept in the first base station, to the third base station, and
send a message including an address and a Tunnel Endpoint Identifier (TEID) of the third base station to the mobility management apparatus.

19. The first base station according to claim 18, wherein the controller is configured to:
when the data radio bearer and the data bearer are established in the second base station, receive from the mobility management apparatus the first configuration information as a response to a request for establishing the data bearer sent from the first base station to the mobility management apparatus, and
when the endpoint of the data radio bearer and the data bearer is changed from the second base station to the third base station, send the first configuration information, which has been kept in the first base station, to the third base station without sending a request for establishing the data bearer to the mobility management apparatus.

20. The first base station according to claim 18, wherein the controller is configured to notify the mobility management apparatus of endpoint information of the data bearer whose endpoint has been changed to the third base station.

21. The first base station according to claim 18, wherein the controller is configured to keep second configuration information generated by updating the first configuration information using information of the third base station even after the endpoint of the data radio bearer and the endpoint of the data bearer have been changed to the third base station.

22. The first base station according to claim 18, wherein the controller is configured to receive, from the third base station, endpoint information of the data bearer whose endpoint has been changed to the third base station.

23. The first base station according to claim 18, wherein the controller is configured to, when the endpoint of the data radio bearer and the endpoint of the data bearer are changed from the second base station to the third base station, generate, based on the first configuration information, third configuration information to establish the data radio bearer between the mobile station and the third base station and transmits the third configuration information to the mobile station via the signaling radio bearer.

24. The first base station according to claim 18, wherein the controller is configured to send the first configuration information to a plurality of candidate base stations including the third base station before the third base station is selected as a base station to which the data bearer and the data radio bearer are changed, and
the controller is configured to instruct the third base station to activate the data bearer after the third base station is selected.

25. The first base station according to claim 24, wherein the controller is configured to select, as the third base station, a candidate base station which satisfies a predetermined condition from the plurality of candidate base stations.

26. The first base station according to claim 25, wherein the predetermined condition relates to at least one of: (a) radio quality of each candidate base station measured by the mobile station; (b) load on each candidate base station; and (c) moving speed of the mobile station.

27. The first base station according to claim 26, wherein the controller is configured to receive at least one of the radio quality and the load from each candidate base station.

28. The first base station according to claim 18, wherein the controller is configured to, when the endpoint of the data radio bearer and the data bearer is changed from the second base station to the first base station, establish the data bearer and the data radio bearer in the first base station by using the first configuration information that has been kept in the first base station.

29. The first base station according to claim 28, wherein the controller is configured to:
when the data radio bearer and the data bearer are established in the second base station, receive, from the mobility management apparatus, the first configuration information as a response to a request for establishing the data bearer sent from the first base station to the mobility management apparatus, and
when the endpoint of the data radio bearer and the endpoint of the data bearer are changed from the second base station to the first base station, establish the data bearer and the data radio bearer in the first base station by using the first configuration information, which has been kept in the first base station, without sending a request for establishing the data bearer to the mobility management apparatus.

30. The first base station according to claim 28, wherein the controller is configured to determine, based on a moving speed of the mobile station, whether the endpoint of the data radio bearer and the endpoint of the data bearer are changed to the first base station or another base station.

31. The first base station according to claim 18, wherein the controller is configured to determine to change the endpoint of the data radio bearer and the endpoint of the data bearer, in response to a trigger notification from the second base station or the mobile station.

32. A mobile station that is used in combination with the radio communication system according to claim 1, the mobile station comprising:
a radio receiver; and
a controller configured to control the radio receiver to receive configuration information regarding the data radio bearer from the first base station and receive or transmit user data using the second cell.

33. The mobile station according to claim 32, wherein the controller is configured to control transmission or reception of the user data via the data radio bearer without establishing a signaling radio bearer with the second base station.

34. A communication control method in a first base station that operates a first cell, the communication control method comprising:
performing control to establish a first signaling bearer with a mobility management apparatus in a core network, establish a second signaling bearer with a second base station that operates a second cell, and establish a signaling radio bearer with a mobile station in the first cell;
sending, to the second base station via the second signaling bearer, first configuration information for establishing a data bearer and a data radio bearer in the second base station, wherein the data bearer is established between the second base station and a data transfer apparatus in the core network, and the data radio bearer is established between the second base station and the mobile station in the second cell;
keeping the first configuration information in the first base station even after the data radio bearer and the data bearer are established in the second base station; and
when an endpoint of the data radio bearer and an endpoint of the data bearer are changed from the second base station to a third base station:
sending the first configuration information, which has been kept in the first base station, to the third base station, and
sending a message including an address and a Tunnel Endpoint Identifier (TEID) of the third base station to the mobility management apparatus.

35. The method according to claim 34, further comprising, when the data radio bearer and the data bearer are established in the second base station, receiving from the mobility management apparatus the first configuration information as a response to a request for establishing the data bearer sent from the first base station to the mobility management apparatus, wherein
the sending the first configuration information to the third base station includes sending the first configuration information, which has been kept in the first base station, to the third base station without sending a request for establishing the data bearer to the mobility management apparatus.

36. The method according to claim 34, further comprising notifying the mobility management apparatus of endpoint information of the data bearer whose endpoint has been changed to the third base station.

37. The method according to claim 34, wherein the sending the first configuration information to the third base station includes:
sending the first configuration information to a plurality of candidate base stations including the third base station before the third base station is selected as a base station to which the data bearer and the data radio bearer are changed; and
instructing the third base station to activate the data bearer after the third base station is selected.

38. The method according to claim 37, wherein the sending the first configuration information to the third base station includes selecting, as the third base station, a candidate base station which satisfies a predetermined condition from the plurality of candidate base stations.

39. The method according to claim 34, further comprising, when the endpoint of the data radio bearer and the endpoint of the data bearer are changed from the second base station to the first base station, establishing the data bearer and the data radio bearer in the first base station by using the first configuration information that has been kept in the first base station.

40. The method according to claim 39, further comprising, when the data radio bearer and the data bearer are established in the second base station, receiving, from the mobility management apparatus, the first configuration information as a response to a request for establishing the data bearer sent from the first base station to the mobility management apparatus, wherein
the establishing the data bearer and the data radio bearer in the first base station includes configuring the data bearer and the data radio bearer in the first base station by using the first configuration information, which has been kept in the first base station, without sending a request for establishing the data bearer to the mobility management apparatus.

41. The method according to claim 39, further comprising determining, based on a moving speed of the mobile station, whether the endpoint of the data radio bearer and the endpoint of the data bearer are changed to the first base station or another base station.

42. A non-transitory computer readable medium storing a program for causing a computer to perform a communication control method in a first base station that operates a first cell, wherein
the communication control method comprises:
performing control to establish a first signaling bearer with a mobility management apparatus in a core network, establish a second signaling bearer with a second base station that operates a second cell, and establish a signaling radio bearer with a mobile station in the first cell,
sending, to the second base station via the second signaling bearer, first configuration information for establishing a data bearer and a data radio bearer in the second base station, wherein the data bearer is established between the second base station and a data transfer apparatus in the core network, and the data radio bearer is established between the second base station and the mobile station in the second cell;
keeping the first configuration information in the first base station even after the data radio bearer and the data bearer are established in the second base station; and
when an endpoint of the data radio bearer and an endpoint of the data bearer are changed from the second base station to a third base station:
sending the first configuration information, which has been kept in the first base station, to the third base station, and
sending a message including an address and a Tunnel Endpoint Identifier (TEID) of the third base station to the mobility management apparatus.

43. A master base station comprising:
a memory storing instructions; and
at least one hardware processor configured to process the instructions to:
transmit a first message, from the master base station to a target base station, for transferring an user equipment (UE) from a source base station to the target base station wherein the first message includes an identifier of an E-UTRAN Radio Access Bearer (E-RAB) of the source base station, a quality parameter of the E-RAB, and S1 General Packet Radio Service Tunneling Protocol (GTP) Tunnel Endpoint information corresponding to the E-RAB;
receive, from the target base station, a response of the first message, the response including a Tunnel Endpoint Identifier (TEID) of the target base station corresponding to the E-RAB; and
transmit, to a Mobility Management Entity (MME), a second message including an address of the target base station and the TEID of the target base station corresponding to the E-RAB.

44. The master base station according to claim 43, wherein
an S1-MME interface for the UE is terminated in the master base station, and
S1-U interfaces for the UE are terminated in the source base station and the target base station.

45. The master base station according to claim 44, wherein
the S1-MME interface is used for Control Plane, and
the S1-U interfaces are is used for User Plane.

46. The master base station according to claim 44, wherein the S1-MME interface and the S1-U interfaces are used simultaneously.

47. A communication control method in a master base station, the method comprising:
transmitting a first message, to a target base station, for transferring a user equipment (UE) from a source base station to the target base station, wherein the first message includes an identifier of an E-UTRAN Radio Access Bearer (E-RAB) of the source base station, a quality parameter of the E-RAB, and S1 General Packet Radio Service Tunneling Protocol (GTP) Tunnel Endpoint information corresponding to the E-RAB;
receiving, from the target base station, a response of the first message, the response including a Tunnel Endpoint Identifier (TEID) of the target base station corresponding to the E-RAB; and
transmitting, to a Mobility Management Entity (MME), a second message including an address of the target base station and the TEID of the target base station.

48. The method according to the claim 47, wherein
an S1-MME interface for the UE is terminated in the master base station, and
S1-U interfaces for the UE are terminated in the source base station and the target base station.

49. The method according to the claim 48, wherein
the S1-MME interface is used for Control Plane, and
the S1-U interfaces are is used for User Plane.

50. The method according to the claim 48, wherein the S1-MME interface and the S1-U interfaces are used simultaneously.

* * * * *